US012786285B2

(12) United States Patent
Stein et al.

(10) Patent No.: US 12,786,285 B2
(45) Date of Patent: Nov. 3, 2026

(54) DATA BROKER ARCHITECTURES FOR INDUSTRIAL DATA PROVISIONING

(71) Applicant: Honeywell International Inc., Charlotte, NC (US)

(72) Inventors: Rod Stein, Edmonton (CA); Surinder Kumar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 34 days.

(21) Appl. No.: 18/938,342

(22) Filed: Nov. 6, 2024

(65) Prior Publication Data

US 2025/0141976 A1 May 1, 2025

(51) Int. Cl.
*H04L 67/562* (2022.01)

(52) U.S. Cl.
CPC .................................. *H04L 67/562* (2022.05)

(58) Field of Classification Search
CPC ..................................................... H04L 67/562
See application file for complete search history.

(56) References Cited

U.S. PATENT DOCUMENTS

| | | | | |
|---|---|---|---|---|
| 2006/0106851 | A1 * | 5/2006 | Warshawsky | G06F 16/2358 |
| 2007/0219649 | A1 * | 9/2007 | Allman | G06Q 40/00<br>700/73 |
| 2008/0284591 | A1 * | 11/2008 | Armstrong | G08B 21/04<br>455/414.1 |
| 2012/0030344 | A1 * | 2/2012 | Karenos | H04L 43/55<br>709/224 |
| 2023/0098081 | A1 * | 3/2023 | Romagnoli | G06Q 10/0633<br>705/7.27 |
| 2023/0401134 | A1 * | 12/2023 | Gupta | G06F 9/5027 |

* cited by examiner

*Primary Examiner* — Viet D Vu
(74) *Attorney, Agent, or Firm* — Alston & Bird LLP

(57) ABSTRACT

Examples techniques of data provisioning in an industrial facility are described. A first data broker receives from a client, a request for data from a data source. A second data broker samples the data from the data source at a sampling interval specified in the request and publishes the sampled data to an upstream data broker at publishing interval specified in the request. The upstream data broker is an intermediate data broker positioned between the first data broker and the second data broker in a hierarchical chain data brokers implemented in a communication network of the industrial facility. The intermediate data broker configured to receive the published data and transmit the received data to the first data broker at a sampling and publishing intervals less than the second data broker.

17 Claims, 9 Drawing Sheets

DATA BROKER ARCHITECTURES FOR INDUSTRIAL DATA PROVISIONING

BACKGROUND

Industrial automation entails the use of control systems, information technologies, and machines to manage industrial processes and asset, reducing the need for human intervention. The field of industrial automation has evolved from simple mechanical systems to sophisticated computer-controlled networks, increasing efficiency, precision, and productivity in manufacturing and other industrial sectors.

Modern industrial automation systems generally consist of several key components working in harmony. These components may include, but are not limited to, field devices, such as sensors and actuators for data collection and physical control, programmable logic controllers (PLCs) or distributed control systems (DCS) for process management, human-machine interfaces (HMIs) for operator interaction, and industrial communication networks for data communication. Advanced automation systems may also incorporate data analytics, artificial intelligence, and machine learning capabilities to optimize processes and predict maintenance needs.

The advent of Industry 4.0, often called the fourth industrial revolution, has further transformed industrial automation. This paradigm integrates technologies such as the Internet of Things (IoT), cloud computing, and big data analytics into industrial processes, enabling the creation of "smart factories." In these environments, machines may communicate with each other and make decentralized decisions, leading to more flexible and adaptive automation systems.

In these advanced industrial automation systems, communication between various components is crucial. For example, sensors and other field devices may continuously collect data on asset performance, environmental conditions, and process parameters. This data may also be transmitted to centralized servers or cloud-based platforms for further analysis, enabling real-time process monitoring, predictive maintenance, and optimization of operations. Communication infrastructures in these advanced industrial automation systems often involves multiple layers, from a field level where the data is generated, through various intermediary stages, up to an enterprise level where high-level decisions are made.

As industrial facilities grow in complexity and scale, the volume of the data generated and transmitted across the layers of the industrial communication networks may increase exponentially. This necessitates robust and efficient data provisioning strategies to ensure that critical information flows seamlessly from its point of origin to where it is needed most. Thus, communication infrastructures in these advanced industrial automation systems is expected to not only manage this vast amount of the data but also ensure its timely delivery across different network segments, each generally governed by distinct security protocols and operational requirements. Effective solutions for communication of the data may need to balance considerations of data throughput, latency, security, and the specific needs of various stakeholders within the industrial ecosystem.

SUMMARY

The details of some embodiments of the subject matter described in this specification are set forth in the accompanying drawings and the description below. Other features, aspects, and advantages of the subject matter will become apparent from the description, the drawings, and the claims.

The present subject matter relates to methods, systems, and non-transitory computer-readable media for data provisioning in industrial facilities.

According to an aspect of the present subject matter, a method for data provisioning in an industrial facility includes operations in a communication network of the industrial facility. The communication network includes a hierarchical chain of data brokers. This chain of the data brokers includes a first data broker connected to a client, a second data broker connected to a data source, and at least one intermediate data broker between the first data broker and the second data broker. The method includes receiving a request from the client at the first data broker. This request is for data from the data source. The request specifies two parameters: a sampling interval for acquiring the data and a publishing interval for transmitting the acquired data to the client. The method further includes operating the second data broker in accordance with the sampling interval and the publishing interval to provide the data to the client. Furthermore, the method includes operating the at least one intermediate data broker independent of the sampling interval and the publishing interval to provide the data to the client.

In accordance with an embodiment of the present subject matter, the system for data provisioning in an industrial facility includes a processor to configure a first data broker to receive, from a client, a request for data from a data source. In an example, the request specifies a sampling interval for acquiring the data and a publishing interval for transmitting the acquired data to the client. The system includes a second data broker. The processor is to configure the second data broker to sample the data from the data source at the specified sampling interval and publish the sampled data to an upstream data broker at the specified publishing interval. In an example, the upstream data broker is from amongst at least one intermediate data broker between the first data broker and the second data broker in a hierarchical chain data brokers implemented in a communication network of the industrial facility. The processor is to further configure the at least one intermediate data broker to receive the published data and transmit the received data to the first data broker. In an example, the first data broker is positioned upstream to the at least one intermediate data broker in the hierarchical chain of data brokers.

In accordance with an embodiment of the present subject matter, the non-transitory computer-readable medium contains instructions that enable a processing resource to implement, in a communication network of an industrial facility, a hierarchical chain of data brokers. In an example, the hierarchical chain of data brokers includes a first data broker connected to a client, a second data broker connected to a data source, and at least one intermediate data broker positioned between the first data broker and second data broker. The processing resource receives, from the client, at the first data broker, a request for data from the data source. In an example, the request specifies a sampling interval for acquiring the data and a publishing interval for transmitting the acquired data to the client. Further, the processing resource is to access, via a configuration client, configuration settings of the second data broker. Furthermore, the processing resource is to define in the configuration settings, a sampling interval and a publishing interval for the second data broker to correspond to the sampling and publishing intervals specified in the request received from the client. The processing resource is to access, via the configuration client, configuration settings of the at least one intermediate data broker and define therein a sampling interval and a publishing interval for the at least one intermediate data broker to be less than the sampling and publishing intervals specified in the request received from the client.

Embodiments of the present subject matter provide efficient techniques for low latency data provisioning in multi-layered industrial networks. The architecture of the system provides advantages in terms of allowing data brokers to bypass normal publishing and sampling intervals that are typically present in every instance, relying instead on just one of the components to provide this function.

By enabling the data brokers to push operational data without waiting for completion of publishing intervals, the present subject matter allows for rapid transmission of critical information across secure network boundaries. This results in a more responsive and near real-time view of on-site activities, enabling operators to monitor asset states and respond to anomalies as they occur with minimal latency.

Organizations may adopt this method without compromising their existing security infrastructure, as it is built upon the multi-layered communication network commonly used in industrial settings. The ability to receive operational data with reduced latency allows the operators to respond more swiftly to potential issues, minimizing downtime and enhancing the efficiency of plant operations.

Additional features and advantages are realized through the concepts of the present invention. Other embodiments and aspects of the invention are described in detail herein and are considered a part of the claimed invention.

BRIEF DESCRIPTION OF FIGURES

Systems and/or methods, in accordance with examples of the present subject matter, are now described and with reference to the accompanying figures, in which.

DETAILED DESCRIPTION

Figure 1:
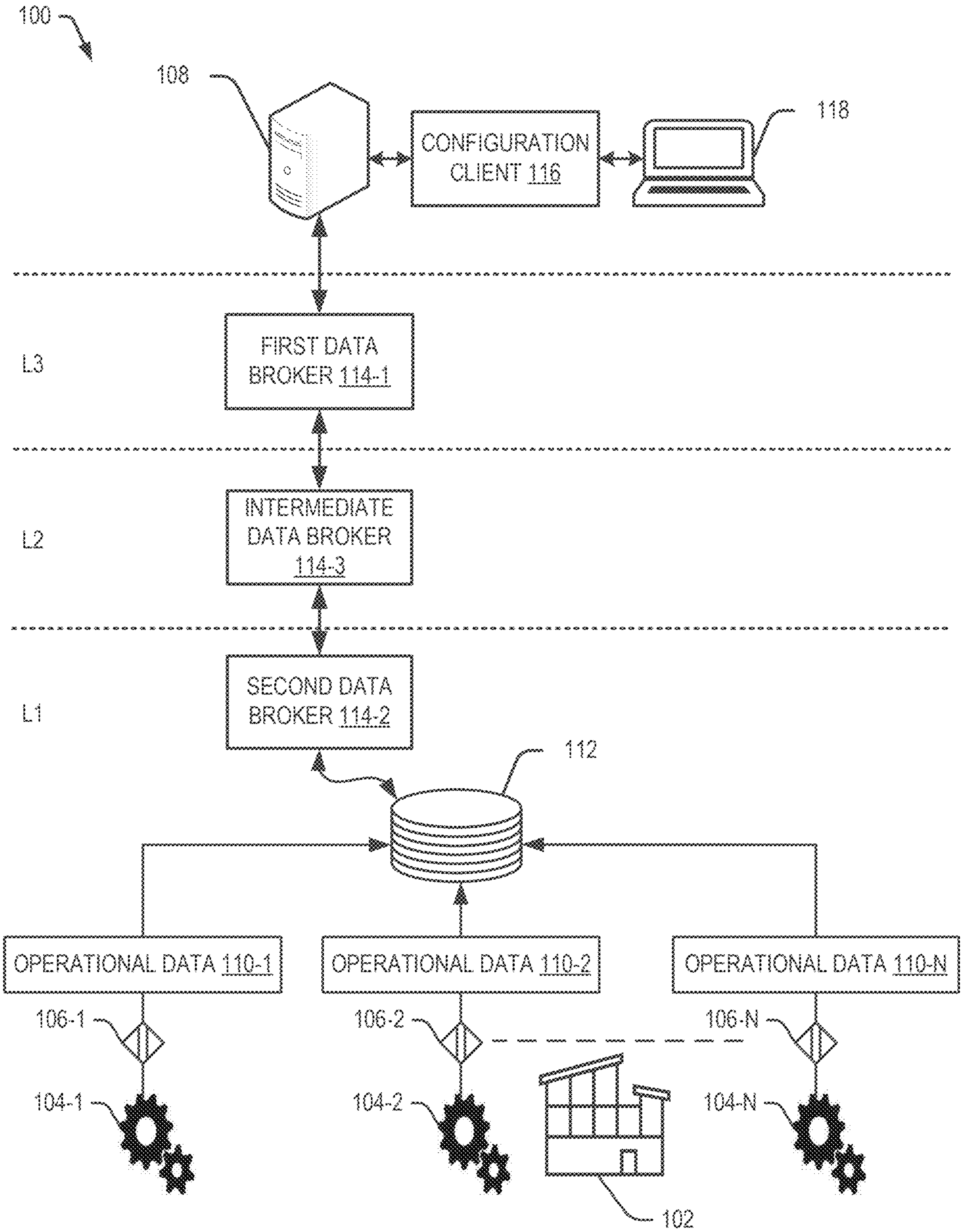
FIG. 1 illustrates a schematic diagram of a communication network for data provisioning in an industrial facility, in accordance with an example implementation of the present subject matter.

As explained previously, rapid automation of industrial processes has brought high efficiency, productivity, and connectivity to manufacturing and process control environments in industrial facilities. The automation of the industrial processes involves the integration of one or more components that may include sensors, actuators, programmable logic controllers (PLCs), distributed control systems (DCSs), and human-machine interfaces (HMIs), and the like. These components work together to monitor, control, and optimize complex industrial operations. For example, the sensors continuously collect data on various parameters, such as temperature, pressure, flow rates, and asset status, providing real-time information about the state of industrial processes in an industrial facility. This data is processed by PLCs or DCSs, which execute predefined control algorithms to make decisions and adjust process parameters. The actuators then implement these decisions, performing physical actions like opening valves, adjusting motor speeds, or activating switches. The HMIs provide operators with visual representations of these processes, allowing for real-time monitoring and manual intervention when necessary.

The industrial facilities rely on communication between these components to automate and optimize industrial processes. Industrial automation systems often employ standardized communication protocols to facilitate the communication between these diverse components. Various protocols, such as Modbus, PROFINET, EtherNet/IP, MQTT, OPC UA, and DNP3, may be used in industrial environments to provide robust, scalable, and platform-independent frameworks for data exchange in the industrial environments. Each of these protocols has its own strengths and is suited for different applications. For example, Modbus is often used for its simplicity and wide compatibility, PROFINET for its real-time capabilities in manufacturing, EtherNet/IP for its integration with standard Ethernet networks, MQTT for its lightweight nature in IoT applications, OPC UA for its comprehensive information modelling, and DNP3 for its reliability in power systems. Communication networks that are based on these communication protocols form the basis for data exchange within industrial facilities.

However, as the industrial facilities grow in complexity and scale, they often implement multi-layered communication networks to enhance security and manage data flow. These communication networks typically include multiple layers, such as a product control network (PCN) layer housing monitoring devices and primary data brokers, a demilitarized zone (DMZ) layer with secondary data brokers, and a corporate layer interfacing with external networks. Each of these layers is typically separated by firewalls to provide additional security and control over data flow between layers. This segmentation helps in isolating critical control systems from potential cyber threats and unauthorized access. However, while this multi-layered approach improves security, it introduces significant challenges in terms of data transmission speed and latency. The communication protocols mentioned earlier are utilized within these communication networks to enable data exchange between components across different layers, subject to the security constraints imposed by the network architecture.

In traditional implementations, components in a communication network that handle data exchange, such as data brokers, may be configured, based on the communication protocol used, to observe their own sampling and publishing intervals. The sampling interval determines how often a data broker checks for new data, while the publishing interval dictates how frequently the data broker sends that data to a next data broker in the communication network. This approach is typically adopted for several reasons. For example, provisioning each data broker with its own sampling and publishing interval may allow each data broker to operate independently, making infrastructure of the communication network more modular and easier to maintain or upgrade. The data brokers may adjust intervals based on processing capabilities and resource constraints. Different data brokers may have different data update frequencies or criticality levels, which may be accommodated by individual interval settings. This configuration may ensure compatibility with various devices and protocols that have different timing requirements. Additionally, this configuration may provide a level of isolation between components, such that if one component experiences issues or fails, it may not necessarily impact the timing of other components in the network.

However, as data traverses through multiple layers of the communication network, each data broker introduces its own delay based on these intervals. This cascading effect may result in a significant cumulative delays, especially in complex communication networks with multiple hops. This cumulative delay becomes particularly problematic in scenarios requiring real-time or near-real-time data access. For example, in a process control application where rapid response to asset anomalies is crucial, even a few seconds delay may have significant consequences. Similarly, in manufacturing environments where precise timing is essential for quality control, excessive latency in data transmission may lead to production inefficiencies or defects.

Moreover, the problem of latency becomes more severe in large-scale industrial facilities where data may need to pass through numerous components before reaching the end-user, for example, a client subscribed to the data, or application. Each additional hop in the communication network adds more delay, degrading the overall responsiveness of the communication network.

Another aspect of this problem relates to network bandwidth utilization. In communication networks where each component strictly adheres to its sampling and publishing intervals, there may be unnecessary network traffic generated when data has not changed, or when changes are not time critical. This inefficient use of resources of the communication network may further contribute to latency in the data transmission and may impact the performance of other critical operations sharing the same communication network. Moreover, this may lead to increased energy consumption and wear on infrastructure of the communication network, potentially reducing the overall lifespan of the infrastructure of the communication network.

The problem is further complicated by the need to maintain compliance with communication standards and preserve the security benefits of the multi-layered communication networks. Any solution to reduce latency is expected to do so without compromising these security aspects of industrial automation systems.

The latency issue in industrial automation communication networks is further compounded by the limitations of the existing solutions. Presently, all existing solutions need to enforce the latency penalty associated with each component of the communication network observing its own sampling and publishing interval. While it is possible to minimize this latency to some extent by tuning these intervals to be very short, this approach comes with certain drawbacks. For example, shortening the sampling and publishing intervals may increase processing resource usage across the network components. This increased processing demand may strain network resources, leading to performance issues or even instability of the network resources. Moreover, such an approach may result in very high bandwidth requirements. The increased frequency of data transmission may lead to inefficient use of the resources of the communication network and may overwhelm the resources of the communication network. Additionally, this approach may not be feasible for all types of industrial asset, especially legacy systems that may have limitations on their communication capabilities.

Alternative solutions attempt to address the latency issue by opening firewall rules and allowing direct connections that bypass the security model. While this approach may reduce latency by eliminating intermediate hops in the data transmission path, it negates the reason for implementing firewalls in the first place. This solution compromises the security of the communication network, exposing data to cyber threats.

These existing solutions to reduce latency in the data transmission present an undesirable trade-off between the performance of the communication network, resource utilization, and security. While implementing the existing solutions, the facilities need to either accept the latency inherent in their multi-layered, secure communication networks or compromise on either network resources or security to achieve lower latency.

Thus, due to the limitations of the conventional communication protocols that require adherence to predetermined sampling and publishing intervals, there may be scenarios where real-time data transmission experiences delays. In industrial settings where rapid response times are crucial, these delays may impact operational efficiency and decision-making processes. Furthermore, the predetermined nature of the sampling and publishing intervals may not always accommodate the diverse data transmission needs of modern industrial facilities, which often require both real-time and historical data access. As a result, there may be a need for a more flexible and responsive data provisioning technique that may overcome these limitations and provide low-latency data transmission across multi-layered industrial communication networks.

According to example implementations of the present invention, approaches for data provisioning in an industrial facility that may allow for reducing latency in a communication network are described.

In accordance with example embodiments of the present subject matter, a method for data provisioning in an industrial facility enables low-latency data transmission across multiple network layers while maintaining robust security measures. In an example, the method for the data provisioning in the industrial facility may be implemented in a communication network with a hierarchical chain of data brokers. The chain may include a first data broker connected to a client, a second data broker connected to a data source, and at least one intermediate data broker between the first data broker and the second data broker. The second data broker may be the one closest to the data source in the hierarchical chain of data brokers within the communication network. The client may send a request for data to the first data broker, specifying sampling and publishing intervals for the data. In accordance with the example embodiments of the present subject matter, the second data broker operates according to these specified intervals, while the intermediate data brokers are configured to function independent of the publishing and the sampling intervals.

Thus, the intermediate data brokers present between the first data broker and the second data broker may be configured to operate differently from a traditional data broker in a communication network, such as an OPC UA-based communication network. Instead of waiting for their sampling and publishing intervals to expire, the intermediate data broker may be configured to transmit any received data independent of the publishing and sampling intervals. This immediate transmission of the data through the intermediate data broker reduces the cumulative latency typically introduced by multiple data broker present between the first data broker and the second data broker in the communication network. Thus, the data may now flow rapidly from the source to the client without being delayed at each intermediate data broker.

Furthermore, while the present invention modifies the behaviour of intermediate data brokers, the present subject matter still maintains compliance of the communication network with the OPC UA specification. In an embodiment, by having the second data broker alone observe the publishing and the sampling of time interval, the OPC UA specification is complied with, and security is maintained. At the same time, bypassing of the publishing and sampling interval the by the intermediate data brokers reduces latency. This ensures that the data collection and initial publication occur according to the OPC UA specification.

Also, the intermediate data brokers, although bypassing their local sampling and publishing intervals, still utilize OPC UA communication protocols and data structures. The intermediate data brokers continue to function as OPC UA servers and clients, maintaining the hierarchical structure and security features defined in the OPC UA specification. The modification in the working of the intermediate data brokers primarily affects the timing of the data transmission, not the fundamental OPC UA mechanisms. The intermediate data brokers still process subscriptions, handle data changes, and manage sessions as per the OPC UA specification. The intermediate data brokers simply transmit the data more rapidly than in traditional implementations.

Moreover, from the perspective of the client and the second data broker, i.e., the bottommost data broker in the hierarchical chain, the communication network appears to function as a standard OPC UA communication network. The client still specifies sampling and publishing intervals and receives data accordingly. The difference lies in the reduced latency of data delivery. The OPC UA specification allows for implementation-specific optimizations as long as the core functionality and interfaces are maintained. This invention leverages this flexibility to enhance performance while preserving the essential characteristics and interoperability of OPC UA systems.

Accordingly, by reconfiguring how the data brokers in the communication network handle data transmission, the present subject matter achieves latency reduction without compromising the security benefits of multi-layered network architectures while still being compliant with the OPC UA specification. The present subject matter allows for maintaining the sampling and publishing intervals at the data broker nearest to the data source, ensuring data accuracy while streamlining data flow through the rest of the network components.

The above techniques are further described with reference to FIG. 1 to FIG. 9. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a block diagram of a communication network 100 for implementing examples techniques of data provisioning in an industrial facility, in accordance with an example implementation of the present subject matter. In an embodiment, the communication network 100 may be based on a communication protocol such as OPC UA (Open Platform Communications Unified Architecture), Modbus, PROFINET, EtherNet/IP, or other industrial communication protocols designed for real-time data exchange in industrial environments.

As shown in FIG. 1, there are layers in the communication network 100 in any industrial facility, such as an industrial facility 102 (hereinafter 'facility'), namely, a first layer L1, a second layer L2, and a third layer L3. In an embodiment, the first layer L1, usually referred to as a process control network (PCN) layer is the lowest layer, closest to physical assets and processes of the facility 102. In an example, the first layer L1 may include field assets, such as assets 104-1, 104-2 . . . , 104-N (hereinafter asset(s) 104) and sensors 106-1, 106-1, . . . , and 106-N (hereinafter sensor(s) 106) coupled to the asset(s) 104, respectively. In an example, the asset(s) 104 may be interconnected and may work in conjunction with each other to perform a process within the facility 102. In examples, the asset(s) 104 may also include actuators, programmable logic controllers (PLCs), and other field devices. In an example, the first layer L1 may be responsible for real-time control and data acquisition from industrial processes, for example, those carried out by the asset(s) 104.

In an embodiment, the second layer L2 may be a demilitarized zone (DMZ) layer. As may be understood, the DMZ layer may be implemented to provide additional security to the communication network 100 by limiting direct exposure of the asset(s) 104 and their data to a larger network such as internet. The DMZ may act as a buffer between the first layer L1 and the third layer L3 or external connections, allowing for controlled and monitored data exchange while minimizing potential security risks. This arrangement helps protect critical industrial systems and data from unauthorized access or potential cyber threats originating from external networks.

In an embodiment, the third layer L3, generally referred to as the corporate layer, may be the top layer of the communication network 100, connecting to external networks and the internet. In an example, the third layer L3 may include business systems, enterprise resource planning (ERP) software, and other corporate applications that may be used to standardize and optimizing operational processes across the facility 102. In an example, each of the first layer L1, the second layer L2, and the third layer L3 may be separated by a firewall. These firewalls may serve as security barriers between the different network layers, controlling and monitoring the flow of data traffic between them. The firewall between the first layer L1 and the second layer L2 protect the industrial control systems and the field devices from threats originating in higher layers. Similarly, the firewall between the second layer L2 and the third layer L3 may provide an additional layer of security, isolating the third layer from the industrial control systems.

In an embodiment, an industrial control system 108 (hereinafter 'system 108') may be implemented in the facility 102 to regulate the communication network 100 in a process to carry out the industrial processes within the facility 102. The system 108 may allow for creation, modification, and enforcement of standard operating procedures (SOPs), ensuring consistency and compliance in the industrial processes. The system 108 may also facilitate the tracking of work orders, maintenance schedules, and resource allocation within the facility 102.

As may be understood, industrial processes may be carried out in the facility 102, which may be an oil refinery, chemical plant, paper mill, etc., wherein the asset(s) 104, installed in the facility 102 operate in conjunction with each other to accomplish a predefined task. For example, in the case of an HVAC system, assets such as chillers, boilers, heat exchangers, and pumps operate in conjunction with each other to air condition a premises. An industrial process may involve chemical, electrical, or mechanical procedures for a predefined purpose, for instance, to manufacture an item, or provide air conditioning, or generate fire alerts.

In an embodiment, the asset(s) 104 may be operated in accordance with a predefined SOP to accomplish the predefined tasks. To operate the asset as per the predefines SOPs, operating parameters of the asset(s) 104 or components thereof may be controlled, for example, by the system 108, as per the SOPs of the industrial process and measured, for example, using the sensor(s) 106 coupled to the asset(s) 104, respectively.

In an example, the system 108 may be any computing device, such as a server, a desktop computer, laptop, smartphones, or a tablet. The system 108 may comprise one or more processors for executing instructions, for example, to control and monitor the operating parameters of the asset(s) 104 or the components of the asset(s) 104. In an example, the processor may be implemented as microprocessors, microcomputers, microcontrollers, digital signal processors, central processing units, state machines, logic circuitries, and/or any devices that manipulate signals based on operational instructions. The system 108 may comprise a memory for storing the instructions executable by the one or more processor. The memory may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like. The instructions may cause the processor to control and monitor the operating parameters of the asset(s) 104.

In an example, the operating parameters of an asset may be understood as attributes of the asset that may be controlled or measured. Examples of the operating parameters may include operational state, such as an 'off' or 'on' state of an asset as well as variable parameters, such as temperature and pressure associated with various components of the asset, that may be sensed, for example, by a corresponding sensor. Referring to the above example of the HVAC system implemented to air condition a premise, the assets, i.e., the chillers, boiler, heat exchangers, and pumps may be operated in accordance with the predefined range of values of the operating parameters of the HVAC system, which considers various factors, such as the temperature to be maintained in the premises, ambient temperature, humidity, etc.

To cause the asset(s) 104 to operate as per the SOP, the system 108 may be used to define a range of values for the operating parameters of the asset(s) 104. In an example, the range of values for the various operating parameters of the asset(s) 104 may be defined, for example, by a manager of the facility 102, in accordance with an SOP corresponding to the industrial processes that the asset(s) 104 are operable to carry out in the facility 102. In an example, for optimal operation of the industrial processes, the asset(s) 104 may be operated in a manner that their operating parameters remain within predefined ranges of values while also achieving the predefined SOPs.

In an example implementation, the system 108 may need monitor the operating parameters of the asset(s) 104 installed in the facility 102 to ascertain whether the operational parameters of the asset(s) 104 continue to comply with the predefined SOPs of the industrial process carried out in the facility 102 and to ensure that the operating parameters of the asset(s) 104 remain within predefined ranges of values. Based on this monitoring, the system 108 may accordingly control the operation of these asset(s) 104, for example, by controlling the values of the operating parameters, to ensure that the asset(s) 104 operate in accordance with the predefined SOPs and the operating parameters of the asset(s) 104 remain within the specified ranges. In an example, to monitor the operation of the asset(s) 104, the system 108 may require the values of the operating parameters of the asset(s) 104 or components thereof.

In an embodiment, the operating parameters of the asset (s) 104 may be retrieved, for example, from the corresponding sensor(s) 106 or directly from the assets 104 as operational data 110-1, 110-2, . . . , 110-N (hereinafter operational data 110). The operational data 110 may be stored, continuously or at predetermined intervals, in a data source, such as a data source 112. The operational data 110 stored in the data source 112 may be utilized by the system 108 to detect deviations in processes occurring within the facility 102, in conjunction with the asset(s) 104. In an example, the data source 112 may be implemented and maintained within the facility 102 as an on-premises data source or may be a cloud-based storage solution accessible by the system 108 over to the communication network 100.

In an embodiment, to transmit the operational data 110 from the data source 112 to the system 108 or any other client who may have subscribed to the operational data 110, a hierarchical chain of data brokers may be used. In an example, the hierarchical chain of data brokers may include a first data broker 114-1 connected to the system 108 seeking to access the operational data 110 subscribed by the system 108, a second data broker 114-2 connected to the data source 112, and one intermediate data broker 114-3 present between the first data broker 114-1 and the second data broker 114-2. In an example, the data brokers may be understood as specialized software components or services designed to facilitate the transfer of data across different network layers and security boundaries within an industrial facility, such as the facility 102.

In an example, the data brokers may serve several functions in the data transmission process, including, but not limited to, data collection from assets and sensors, such as the asset(s) 104 and the sensor(s) 106, aggregation of information from multiple sources, transformation and preprocessing of data, buffering and caching for improved performance, routing and distribution of data to appropriate destinations, enforcement of security measures, protocol translation for seamless integration, management of quality of service, implementation of fault tolerance mechanisms, and monitoring and logging of data flow. Although not depicted in this example, the hierarchical chain may include additional intermediate data brokers between the first data broker 114-1 and the second data broker 114-2. The number of intermediate data brokers may vary depending on the complexity of the communication network 100, security requirements, and the specific needs of the facility 102.

In an embodiment, the system 108 or any other client, such as a maintenance management system, a production planning system, an enterprise resource planning (ERP) system, a mobile device application, or a third-party analytics platform, may have subscribed to the operational data 110 corresponding to one or more of the asset(s) 104 or components thereof.

In some embodiments, the system 108 may have subscribed to specific operational data, such as operational data corresponding to operating parameters of a specific asset, such as an asset 104-1. The subscription may be based on various criteria, including but not limited to asset type, asset location, data type, or specific performance metrics. For example, a client may subscribe to temperature data from all heat-sensitive equipment, vibration data from rotating machinery, or energy consumption data from a particular production line.

In an embodiment, the client, such as the system 108, who may have subscribed to the operational data 110 may send a request to the first data broker 114-1 for accessing the subscribed operational data 110 from the data source 112. In an example, the request from the client may include metadata specifying a sampling interval and publishing interval for the data. In an example, the sampling interval may correspond to the frequency at which the second data broker 114-2 is to collect or measures the operational data 110 from the data source 112. The publishing interval, on the other hand, may refer to the frequency at which the acquired data from the data source 112 is to be transmitted to the system 108. In an example, the sampling and the publishing intervals may be specified independently to optimize data collection and transmission based on the specific requirements of the client and the characteristics of the monitored assets. For example, a client monitoring a rapidly changing process may request a short sampling interval to capture high-frequency variations in the operational data. Conversely, for slowly changing parameters, a longer sampling interval may be sufficient.

In an example, upon receiving the request for the operational data 110 from the data source 112, the first data broker 114-1 may pass down the request to the second data broker 114-2 via the intermediate data broker 114-3 to retrieve the requested operational data 110. In an example, upon receiving the request, the second data broker 114-2, being closest to the data source 112, may initiate collection of the operational data 110 from the data source 112 at the specified sampling interval. In an example, the second data broker 114-2 may transmit the collected operational data 110 to the intermediate data broker 114-3 at regular intervals defined by the specified publishing interval.

In an embodiment, configuration settings of the intermediate data broker 114-3 may be accessed by a configuration client 116, for example, using a configuration device 118, to configure the intermediate data broker 114-3 to operate independent of the sampling interval and the publishing interval. In other words, the intermediate data broker 114-3 may be configured to immediately forward the received operational data 110 to the next data broker, that is the first data broker 114-1 in the chain, without waiting for the expiry of the specified publishing interval. In an example, the configuration may include, but is not limited to, setting the intermediate data broker 114-3 to operate in a "pass-through" or "low-latency" mode, disabling any local buffering or aggregation of data that typically occur during a publishing interval, and the like. Examples of the configuration device 118 may include but are not limited to, desktop computers, laptops, smartphones, personal digital assistants (PDAs), tablets, and the like.

In an embodiment, the configuration client 116 may be understood as a component acting as a configuration utility that may execute on any computing device, such as the configuration device 118. In an example, the configuration client 116 may function as a standalone thick client utility used to configure the functions of the data brokers of the communication network 100. When operating as a standalone thick client, the configuration client 116 may be accessed by a user of the system 108, such as the manager of the facility 102, using the configuration device 118 to modify settings and parameters of the data brokers, such as the intermediate data broker 114-3. The configuration client 116 may communicate with the intermediate data broker 114-3, through the communication network 100 already established for the data transmission. In another embodiment, the configuration client 116 may be implemented as a part of the system 108, for example, as a built-in configuration client.

Since the intermediate data broker 114-3 is configured to bypass the traditional sampling and publishing intervals, instead of waiting for the lapse of its sampling and publishing intervals, the intermediate data broker 114-3 may immediately transmit any received data. This immediate transmission of data through the intermediate data broker 114-3 may reduce the cumulative latency typically introduced by multiple data brokers present between the first data broker 114-1 and the second data broker 114-2 in the communication network 100. As a result, data may flow rapidly from the data source 112 to the client without being delayed at each intermediate data broker.

This modified behavior of intermediate data brokers maintains compliance with industrial communication standards while optimizing data flow. By having only the second data broker observe the publishing and sampling time intervals, the system adheres to standard specifications and maintains security. Simultaneously, bypassing the publishing and sampling intervals at the intermediate data brokers reduces overall latency. This approach ensures that data collection and initial publication occur according to standard protocols, while enabling faster data transmission through the network layers.

Figure 2:
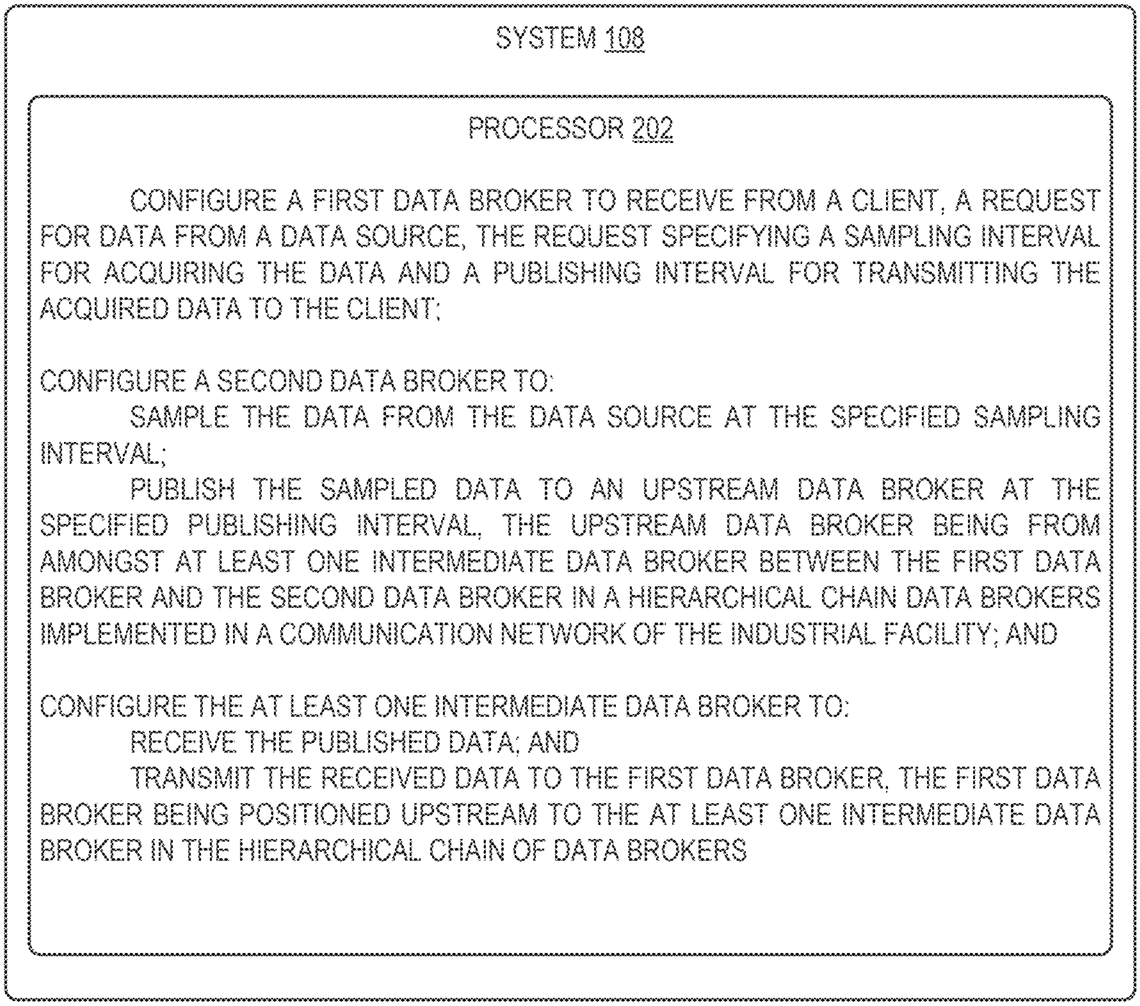
FIG. 2 illustrates a system for data provisioning in the industrial facility, in accordance with an example implementation of the present subject matter.

FIG. 2 illustrates the system 108 for data provisioning, according to an example implementation of the present subject matter. In an example, system 108 comprises a processor 202. As explained previously, the system 108 may be a process control system that may be configured to control the components of the communication network, such as the data brokers, such that the industrial process may be performed in accordance with a predefined SOP. In an example, the system 108 be one or more computing devices, such as desktop computers, laptops, smartphones, personal digital assistants (PDAs), tablets and servers.

In an embodiment, the system 108 may include a processor 202. In an example, the processor 202 may be implemented as microprocessors, microcomputers, microcontrollers, digital signal processors, central processing units, state machines, logic circuitries, and/or any devices that manipulate signals based on operational instructions. The processor 202 may execute instructions stored in a memory of the system 108 to accomplish functionalities of the system 108.

As explained previously with reference to FIG. 1, the asset(s) 104 may be installed in an industrial facility, such as the facility 102, to carry out the industrial process. In an example, the operational data 110 corresponding to the asset(s) 104 may be retrieved, for example, from the corresponding sensor(s) 106 or directly from the asset(s) 104 and stored in the data source 112. In an example, the operational data 110 may be used, for example, by the system 108 or any other client, such as a maintenance management system, a production planning system, an ERP system, a mobile device application, or a third-party analytics platform for a variety of purposes, such as monitoring the performance of the asset(s) 104, predictive maintenance, process optimization, quality control, and real-time decision making. In an example, the operational data 110 may be collected continuously or at predetermined intervals, depending on the specific requirements of the industrial process. In an example, the operational data 110 may include the values of the parameters such as temperature, pressure, flow rates, vibration levels, power consumption, and production output. By analyzing this operational data 110 in real-time or near-real-time, facility managers may identify potential issues, optimize resource allocation, improve overall equipment effectiveness (OEE), and enhance the efficiency and safety of the industrial processes.

In an embodiment, to transmit the operational data 110 to the client that may have subscribed to the operational data 110, a request for the operational data 110 may be initiated by the client. Upon receiving the request from the client, the first data broker 114-1 in a hierarchical chain of data brokers implemented in the communication network 100 may transmit the request to the second data broker 114-2 via the intermediate data broker 114-3. The request may specify a sampling interval for acquiring the data and a publishing interval for transmitting the acquired data to the system 108.

In an example, the second data broker 114-2, may be configured to sample the operational data 110 from the data source 112 at the specified sampling interval. This sampling process ensures that the data is collected at the frequency required by the client. The second data broker 114-2 may then publish the sampled operational data 110 to an upstream data broker, that is the intermediate data broker 114-3, at the specified publishing interval. This intermediate data broker 114-3 may be positioned between the first data broker 114-1 and the second data broker 114-2 in the hierarchical chain of data brokers.

In an example, the intermediate data broker 114-3 in the chain may be configured to receive the published operational data 110 from the second data broker 114-2 and transmit the received operational data 110 to the first data broker 114-1 without applying a predefined publishing interval. This configuration, that may be established prior to run-time, may allow the intermediate data broker 114-3 to bypass the typical interval-based sampling and publishing mechanism. The first data broker 114-1, being positioned upstream to the intermediate data broker 114-3 in the hierarchical chain, may then forward the operational data 110 to the subscribing system 108. This rapid forwarding of the operational data 110 from the intermediate data broker 114-3 may allow for reduced latency in the transmission of the operational data 110 across the network layers.

Furthermore, while bypassing sampling and publishing intervals at intermediate data brokers, the communication network continues to maintain compliance with specified protocols. In an embodiment, by having the second data broker alone observe the publishing and the sampling time intervals, the protocol specification is complied with, and security is maintained. The second data broker, being the initial point of data collection from the data source, adheres to the specified sampling interval for data acquisition and the publishing interval for initial data transmission. This ensures that the data collection and initial publication occur according to the protocol specification. To elaborate on the functioning of the system 108 for data provisioning in a industrial facility, such as the facility 102, reference is made to FIG. 3.

Figure 3:
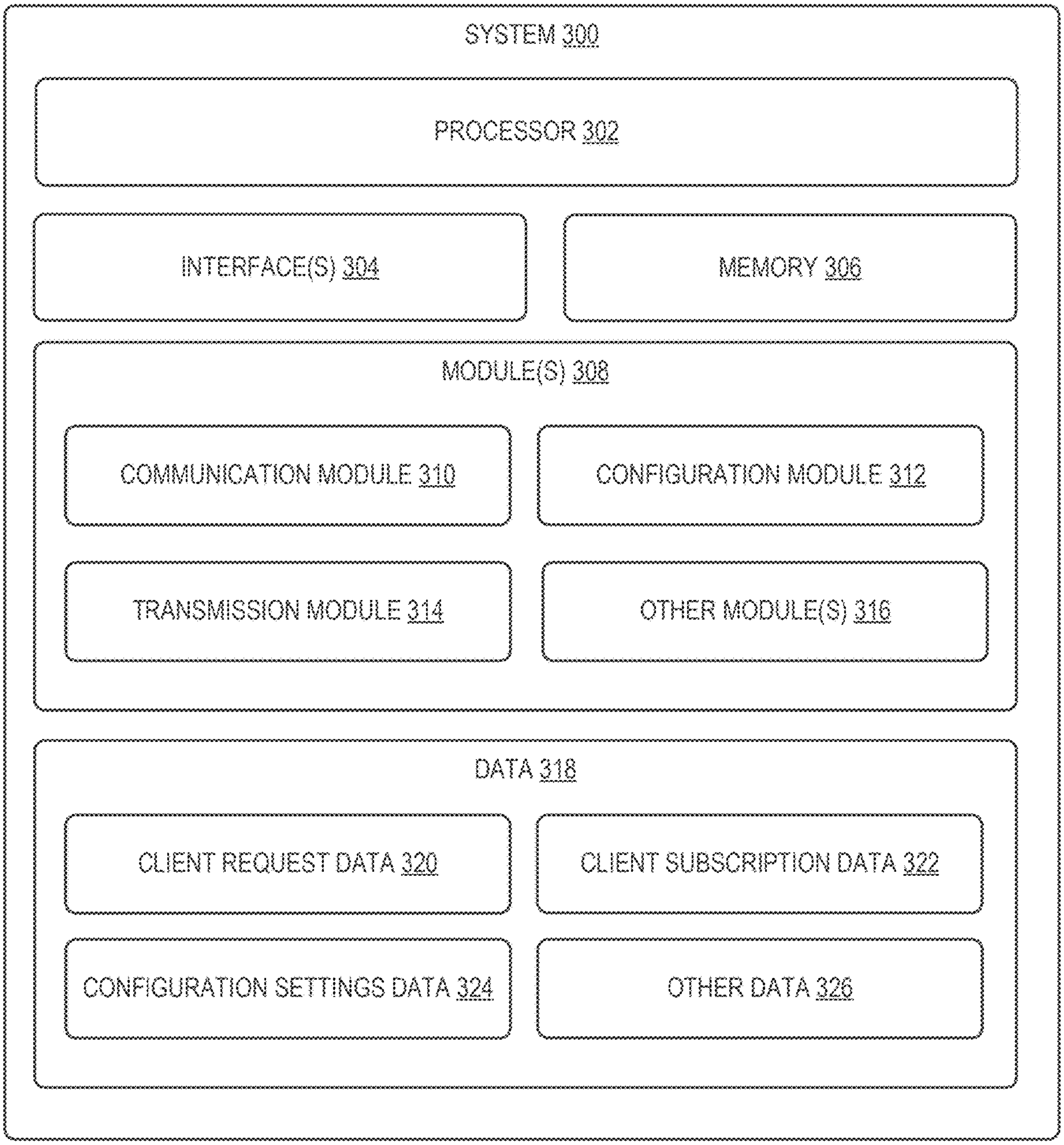
FIG. 3 illustrates the system for data provisioning in the industrial facility, in accordance with another example implementation of the present subject matter.

FIG. 3 illustrates a system 300 for data provisioning according to another example implementation of the present subject matter. In an embodiment, the system 300 may be similar to the system 108 explained in reference to FIGS. 1-2. In an example, the system 300 depicted in FIG. 3 may be any computing device. Examples of the system 300 include but are not restricted to servers, desktop computers, laptops, smartphones, personal digital assistants (PDAs), and tablets.

In an example, the system 300 comprises a processor 302, such as the above-described processor 202. In an example, the processor 302 may be implemented as microprocessors, microcomputers, microcontrollers, digital signal processors, central processing units, state machines, logic circuitries, and/or any devices that manipulate signals based on operational instructions. The system 300 also comprise interface (s) 304 coupled to the processor 302. The interface(s) 304 may include a variety of software and hardware interfaces that allow interaction of the system 300 with other communication and computing devices, such as configuration device 118, network entities, web servers, and external repositories, and peripheral devices. For example, the interface(s) 304 may couple the system 300 with the data source 112. The interface(s) 304 may also enable coupling of internal components of the system 300 with each other.

Further, the system 300 comprises a memory 306 coupled to the processor 302. The memory 306 may include any computer-readable medium known in the art including, for example, volatile memory (e.g., RAM), and/or non-volatile memory (e.g., EPROM, flash memory, etc.). The memory 306 may also be an external memory unit, such as a flash drive, a compact disk drive, an external hard disk drive, or the like. The system 300 may comprise module(s) 308 and data 318 coupled to the processor 302. In one example, the module(s) 308 and data 318 may reside in the memory 306.

In an example, the data 318 may comprise client request data 320, subscribed data, client subscription data 322, configuration settings data 324, and other data 326. The module(s) 308 may include routines, programs, objects, components, data structures, and the like, which perform particular tasks or implement particular abstract data types. The module(s) 308 further includes modules that supplement applications on the system 300, for example, modules of an operating system. The data 318 serves, amongst other things, as a repository for storing data that may be fetched, processed, received, or generated by one or more of the module(s) 308 of the system 300. The module(s) 308 may include a communication module 310, a configuration module 312, a transmission module 314, and other module(s) 316. The other module(s) 316 may include programs or coded instructions that supplement applications and functions, for example, programs in the operating system of the system 300.

As explained previously, data, such as the operational data 110, corresponding to the operating parameters of the asset (s) 104 may be recorded for various reasons. This operational data 110 may include, but is not limited to, temperature readings, pressure measurements, flow rates, equipment status, production rates, and energy consumption metrics. The recording of such data may serve multiple purposes in an industrial facility, such as the facility 102. For example, the operational data 110 may be used by a process control system, such as the system 300, for real-time monitoring of performance of the asset(s) 104, enabling operators to identify and respond to any deviations from normal operating conditions in an on-going basis.

In some embodiments, such as in real-time monitoring applications, the system 300 may compare the incoming operational data 110 against the predefined ranges of values of the operating parameters or expected operating ranges, which may be defined in the SOPs. These SOPs may outline the normal operating parameters for each asset or process, as well as the acceptable ranges for various operational metrics. If any parameter deviates from these SOP-defined ranges, the system 300 may generate alerts or alarms to notify operators or the facility manager. For example, if a temperature reading from an asset exceeds a safe operating limit specified in the SOP, the system 300 may trigger an alert, allowing the operators to take corrective action promptly. The system 300 may also provide guidance based on the SOPs, suggesting specific steps or procedures to follow in response to the detected deviation. In some cases, based on the capabilities of the system 300, the system 300 may itself be configured to initiate automated corrective actions.

In some other embodiments, the operational data 110 may also be utilized by the system 300 for predictive maintenance, where patterns in the operational data 110 may indicate potential asset failures before they occur, allowing for proactive maintenance scheduling. Additionally, the operational data 110 may be utilized for process optimization, quality control, regulatory compliance, and long-term trend analysis to inform strategic decision-making vis-à-vis the industrial processes carried out in the facility 102.

In some embodiments, the operational data 110 may be utilized by external systems or stakeholders, such as corporate headquarters, regulatory bodies, or third-party analytics platforms. These external entities may subscribe to specific data streams, necessitating a robust and efficient data transmission system that may deliver the required information in a timely manner while maintaining data integrity and security across different layers of a communication network, such as the communication network 100, implemented in the facility 102.

The frequency and volume of collection of the operational data 110 may vary depending on the nature of the asset(s) 104 and the specific requirements of the industrial process. Some operating parameters may need to be monitored and recorded at very short intervals, potentially multiple times per second, while others may only require periodic sampling. This variability in data collection needs underscores the importance of a flexible and scalable data management system within the facility 102.

To address these diverse data collection and transmission requirements, the above-introduced system 300 implements data provisioning mechanisms that are elaborated herein. Data provisioning in this context may refer to a process of capturing, processing, and delivering the operational data 110 from the asset(s) 104 to various subscribes of the operational data 110, both within and outside the facility 102. For the data provisioning mechanism to be effective, the system 300 provides to minimize latency, especially for time-sensitive operational data that requires near real-time transmission. This may involve implementing strategies such as immediate data forwarding, where new data is transmitted as soon as it becomes available, rather than waiting for predefined publishing intervals. At the same time, the data provisioning mechanism implemented by the system 300 maintain data integrity and adhere to relevant protocol specifications to ensure the reliability and security of the transmitted information.

As explained previously with reference to FIGS. 1-2, the system 300 may control the components of the communication network 100 to facilitate low-latency data provisioning across multiple layers of the communication network 100 of the facility 102 while maintaining the security of the communication network 100.

In an example, the communication network 100 may include the hierarchical chain of data brokers, such as the data brokers 114-1, 114-2, 114-3, connected to each other in a daisy chain configuration across multiple network layers of the communication network 100, to send and receive the operational data 110 over the communication network 100. For example, the chain of data brokers 114-1, 114-2, 114-3 may include the first data broker 114-1, in the third layer L3, the second data broker 114-2, in the first layer L1, and the intermediate data broker 114-3, in the second layer L2. In an example, the communication module 310 of the system 300 may configure the communication network 100 to have this hierarchical structure. In an example, linkages between the data brokers 114-1, 114-2, 114-3 may be defined using the communication module 310, for example, by an administrator of the system 300. This configuration process may involve specifying network addresses, communication protocols, and security parameters for each data broker in the chain of the data brokers 114-1, 114-2, 114-3. The communication module 310 may also define data flow paths to ensure that operational data 110 is properly routed through the hierarchical structure of the data brokers 114-1, 114-2, 114-3. Additionally, the communication module 310 may set up authentication and authorization mechanisms to control access to operational data 110 at different levels of the hierarchy. In some embodiments, the data brokers 114-1, 114-2, 114-3 may be part of the system 300, or the data brokers 114-1, 114-2, 114-3 may be configured to communicate with the system 300. As explained previously, the system 300 may be a software application or platform that receives, stores, processes, and/or presents the operational data 110 for any of a variety of purposes, such as described elsewhere herein.

In some embodiments, the data brokers 114-1, 114-2, 114-3 may facilitate communication between clients that may be present across the layers of the communication network 100 and the system 300 by receiving messages transmitted from one of these components (i.e., the clients or the system 300) over the communication network 100 and transmitting corresponding messages to the other component (i.e., the system 300 or the clients) over the communication network 100. For example, a client, such as a custom monitoring application implemented in the first layer L1 may send a message containing updated operational data 110 to the second data broker 114-2, which may then forward the corresponding message to the intermediate data broker 114-3 in the second layer L2. The intermediate data broker 114-3 may then pass this message to the first data broker 114-1 in the third layer, which may finally deliver the message to the system 300 for processing or storage or to any other client who may have subscribed for the operational data.

In an embodiment, the clients connected across the communication network 100 and the clients or the system 300 communicate with each other through a data broker of the corresponding layer in which they are located. For example, a client in the second layer L2 may communicate through the intermediate data broker 114-3, while a client in the third layer L3 may communicate through the first data broker 114-1. In some embodiments, the clients or the clients and/or the system 300 may communicate with other applications or data sources of the facility 102 or other remote servers (not illustrated) through the communication network 100. In other embodiments, the clients and/or the clients or the system 300 may only communicate with any other application or data source through the data brokers 114-1, 114-2, 114-3.

In an embodiment, to enable communication between the components of the communication network 100, such as various clients, the clients connected to the communication network 100, and/or the system 300, the data brokers 114-1, 114-2, 114-3 may be implemented as applications running on one or more computing devices using one or more real-time communication protocols. As noted above, the data brokers 114-1, 114-2, 114-3 may be routines or processes running on the system 300. In another implementation, the data brokers 114-1, 114-2, 114-3 may be implemented as separate applications running on a cloud server to which the system 300 may be connected. In an example, the data brokers 114-1, 114-2, 114-3 may utilize an event-based framework to provide control and communication between the components of the communication network 100 and the system 300, for example, by pushing messages to the appropriate recipients upon receiving new data or a request for subscribed data.

In some embodiments, the data brokers 114-1, 114-2, 114-3 may be configured to use multiple communication types, such as WebSocket, server-sent events, forever frame, long polling, or others. If so configured, each data broker may select an appropriate communication type to use for communication between the components of the communication network 100 in respective layer and adjacent layers. In an example, such selection may be made during setup or configuration of the data brokers 114-1, 114-2, 114-3, for example, using the configuration client 116, or the data brokers 114-1, 114-2, 114-3 may include instructions to select an appropriate communication type automatically based upon the capabilities of the connected components (e.g., version, operating system, communication types supported, etc.).

In an example implementation of the present subject matter, the communication module 310 may receive a request from a client for accessing the operational data 110 corresponding to the operating parameters of the asset(s) 104 from the data source 112. As explained previously, the client may be any entity that has subscribed to the operational data 110. In an example, the system 300 may be one such client that has subscribed to the operational data 110 required for running the industrial processes within the facility 102 as per the predefined SOPs. In another example, the client may be any other entity, such as clients, connected across the communication network 100, external monitoring systems, or data analytics platforms. The client may be located in any of the layers of the multi-layered communication network 100, such as the first layer L1, the second layer L2, or the third layer L3. In an example, the request for accessing the operational data 110 may be received at the system 300 if the client requesting the data is connected to the system 300. In another example, the request for accessing the operational data 110 may be received directly at a data broker, such as the first data broker 114-1, to which the client may be connected.

In an embodiment, the request for the operational data 110 may include metadata corresponding to the sampling and publishing interval to be observed while transmitting the operational data 110 to the client. As explained previously, the sampling interval may correspond to the frequency at which the operational data 110 is to be collected from the data source 112 or the asset(s) 104. For example, based in the sampling interval specified in the request, a temperature sensor may sample a reactor temperature every 100 milliseconds. On the other hand, the publishing interval may correspond to the frequency at which the operational data 110 is to be transmitted to the client. For example, the client may specify that the operational data 110 be published every 1 second under normal circumstances. In another embodiment, the metadata in the request may also specify whether to use these predefined intervals of the data brokers 114-1, 114-2, 114-3 or to override them for low-latency transmission. For low-latency needs, the metadata may instruct the system 300 to bypass the standard publishing intervals of the data brokers 114-1, 114-2, 114-3. In an example, the metadata obtained with the request from the client may be stored in the data 318 of the system 300 as the client request data 320 for further processing.

In an embodiment, when the client request data 320 specifies that low-latency mode is to be used for transmitting the operational data 110 to the client that has requested the operational data 110, the configuration module 312 may be used to adjust the settings of the data brokers 114-1, 114-2, 114-3. The settings of the data brokers the data brokers 114-1, 114-2, 114-3 may be configured in such a way that only one data broker of the data brokers 114-1, 114-2, and 114-3 adheres to the publishing and sampling interval specified in the client request data 320 during the data transmission phase, while the other data brokers of the data brokers 114-1, 114-2, and 114-3 operate in a push-based manner.

In an example, the second data broker 114-2, being closest to the data source 112, may be configured to adhere to the publishing and sampling interval specified in the client request data 320. To configure the settings of the second data broker 114-2 in accordance with the client request data 320, the configuration module 312 may interface with the configuration client 116. A user of the system 300 may access the configuration settings of the second data broker 114-2 via the configuration client 116 and configure the second data broker 114-2 to set the sampling and publishing interval of the second data broker 114-2 to match the intervals specified in the client request data 320. Configuring the second data broker 114-2, that is closest to the data source 112, to observe the sampling and publishing interval may optimize data freshness and network efficiency by capturing the most recent operational data 110 from the source, that is the asset(s), while reducing unnecessary traffic.

Furthermore, the configuration settings of intermediate data brokers, such as the intermediate data broker 114-3, may be adjusted via the configuration client 116 to enable instant transmission of the operational data 110 the intermediate data broker 114-3. This configuration may be applied to all intermediate data brokers in the chain. The user may define the behavior of the intermediate data broker 114-3 to align with the client request data 320. For example, the user may configure the intermediate data broker 114-3 to forward operational data 110 as soon as it is received, without waiting for its internal intervals to elapse.

In an example, the user may define the sampling and publishing intervals of the intermediate data brokers in the configuration settings to be in accordance with the client request data 320. In some applications, it may be preferred that all data brokers implemented in the communication network, such as the communication network 100, observe the same protocol intervals for consistency across the communication network 100. However, the system 300 may provide flexibility for setting these parameters as preferred by the user. This adaptability may be required for optimization based on specific application requirements, network conditions, or user preferences. For example, in time-critical applications, a user may set shorter intervals for the data brokers closer to the data source, while allowing longer intervals for higher-level brokers. Conversely, in applications where network traffic optimization is a priority, uniform intervals may be set across all the data brokers.

In an example, the user may set the sampling interval and the publishing interval for the intermediate data broker 114-3 to be less than or equal to the sampling and publishing intervals specified in the request received from the client. For example, if the client request data 320 specifies a sampling interval of 100 milliseconds and a publishing interval of 500 milliseconds, the user may configure the intermediate data broker 114-3 with a sampling interval of 50 milliseconds and a publishing interval of 250 milliseconds. Thus, the intermediate data broker 114-3 may be configured prior to transmit the operational data 110 to the next data broker up the chain with minimal delay, thereby reducing the time the data spends at each intermediate point in the communication network 100. This decreases overall system latency and improving the timeliness of data delivery to the end client.

Similarly, in cases where the end application or user preference is not to choose low-latency mode for transmitting the operational data 110, the sampling interval and publishing interval of the intermediate data broker 114-3 may be configured to correspond to the sampling and publishing intervals specified in the request received from the client. In an example, the configuration settings of the data brokers 114-1, 114-2, 114-3 may be stored in the data 318 as the configuration settings data 324.

In an operation, when the first data broker 114-1 receives a client request for the operational data 110, the same may be routed through the intermediate data broker 114-3 to the second data broker 114-2. The second data broker 114-2, closest to the data source 112, may collect the operational data 110 from the data source 112 at the sampling rate specified in the client request data 320 and publishes the collected operational data 110 at the defined publishing rate to the intermediate data broker 114-3. Upon receiving the operational data 110 from the second data broker 114-2, the intermediate data broker 114-3 may forward any received operational data 110 to the first data broker 114-1 up in the chain without waiting for the completion of any local publishing cycle or adhering to any predefined sampling rate at the intermediate data broker 114-3. For example, a client may request pressure data from a critical industrial process with a sampling rate of 50 milliseconds and a publishing rate of 200 milliseconds. The first data broker 114-1 upon receiving the client request may route the request through the intermediate data broker 114-3 to the second data broker 114-2. The second data broker 114-2 may begin sampling data from the pressure sensor every 50 milliseconds as specified. Every 200 milliseconds, the second data broker 114-2 may publish the collected pressure data to the intermediate data broker 114-3. The intermediate data broker 114-3, upon receiving this data, may forward it to the first data broker 114-1, regardless of its own local intervals as the same may be configured to be skipped or low prior to start of the data transmission process. The first data broker 114-1 may then deliver the pressure data to the client at the requested 200-millisecond intervals.

In embodiments where the client is connected to the system 300, the first data broker 114-1 may pass the operational data 110 received from the intermediate data broker 114-3 to the system 300. The operational data 110 received by the system 300 may be stored as the client subscription data 322 in the data 318. From the system 300, the transmission module 314 may transmit the client subscription data 322 to the client subscribed to the client subscription data 322. In alternative embodiments, the client connected directly to the first data broker 114-1 may receive the operational data 110 forwarded by the intermediate data broker 114-3 as soon as it is received by the first data broker 114-1.

The present subject matter thus enables reducing of latency in data transmission across multi-layered industrial networks by reconfiguring intermediate data brokers to bypass their local sampling and publishing intervals. Instead of adhering to traditional behavior of the communication protocols where each broker introduces delay, these intermediate data brokers are configured to immediately forward received data. This reduces cumulative latency typically introduced by multiple data brokers in the communication chain, allowing data to flow rapidly from the source to the client without being delayed at each intermediate point. This latency reduction is achieved while maintaining the robust security features of multi-layered network architectures and compliance with specified communication protocol, for example, by having the data broker nearest to the source (the second data broker) observe the specified sampling and publishing intervals. Intermediate data brokers, while bypassing these intervals, still work on the specified communication protocols and data structures, functioning as servers and clients of the specified communication protocol, such as the OPC UA. This ensures that data collection and initial publication occur according to specified communication specifications, while subsequent transmission is optimized for speed. From the perspective of the client, the data communication network appears to function as a standard communication network, but with enhanced performance in data delivery.

Figure 4:
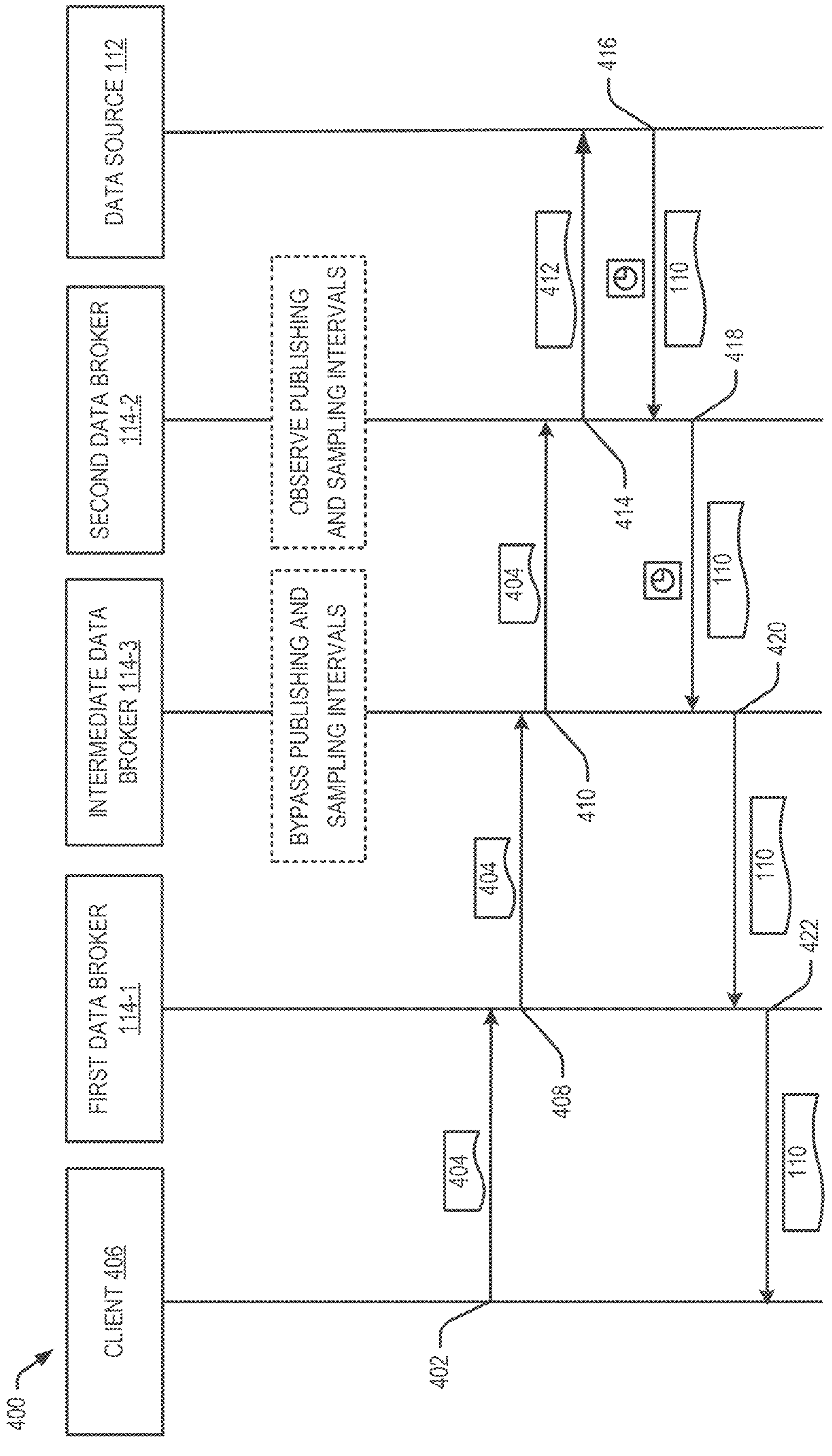
FIG. 4 illustrates a signal flow diagram depicting transmission of data from a data source to a client device in a communication network, in accordance with an example implementation of the present subject matter.

FIG. 4 illustrates a signal flow diagram 400 depicting the transmission of data, such as the operational data 110, over the communication network 100, in accordance with an example implementation of the present subject matter.

The present explanation is provided with reference to the system 108, 300. As discussed previously, the system 108, 300 may be operable to optimize latency in the transmission of the operational data 110 to the client subscribed to the operational data 110 from the data source 112. The system 300 may cause its components to interact as depicted to reduce the latency of data transition through the layers of the communication network 100. This optimization may be necessary in various industrial processes where real-time or near-real-time data is essential for effective decision-making and process control. By minimizing data transmission latency, the system 300 may enhance the capacity of a facility, such as the facility 102, for proactive maintenance, rapid fault detection, and efficient process control.

In an example implementation of the present subject matter, as indicated in step 402, a request 404 for the operational data 110 may be received at the first data broker

114-1, for example, via the communication module 310 of the system 300. In another example, in embodiments where the client is directly connected to the first data broker 114-1, such as depicted in FIG. 4, the request 404 may be received directly at the first data broker 114-1. In an example, the request 404 may be received from a client, for example, a client 406.

In an example, the request 404 may constitute metadata specifying the sampling and publishing intervals and whether the operational data 110 is to be transmitted to the client 406 in a low latency mode. This metadata may include specific parameters that define how the data should be collected, processed, and transmitted through the system. For example, the sampling interval may indicate how frequently the data source 112 is required be queried for new operational data 110, while the publishing interval may specify how often the collected operational data 110 is required to be sent up the chain of data brokers. The low latency mode option, when specified, may instruct the system 300 to prioritize speed of transmission of the operational data 110 over other considerations, for example, bypassing certain processing steps or waiting periods that may otherwise be in place.

As explained previously, in cases where the low latency mode transmission is to be followed, the configuration client 116 may be used to configure the intermediate data broker 114-3 to immediately forward the received operational data 110 to the next data broker without waiting for any publishing or sampling interval. This configuration may involve setting sampling and publishing parameters of the intermediate data broker 114-3 to override default behavior, such as enabling a "pass-through" mode that bypasses internal buffering, and prioritizes data forwarding over local processing. Similarly, the second data broker 114-2 may be configured to observe the sampling and publishing intervals specified in the request 404. In an example, this configuration may be implemented through the configuration client 116 or through pre-set parameters within the second data broker 114-2 itself.

In an example, once the configuration of the data brokers 114-1, 114-2, 114-3 is set in accordance with the request 404, the first data broker 114-1 may communicate the request 404 to the intermediate data broker 114-3 over the communication network 100, as indicated in step 408. As indicated in step 410, the intermediate data broker 114-3 may push the request to the second data broker 114-2. Although note depicted, the communication network 100 may include more than one intermediate data broker 114-3 in the hierarchical chain.

In an example, upon receiving the request 404, the second data broker 114-2 may send an access request 412 to the data source 112, as indicated in step 414. This access request 412 may include authentication credentials, data point identifiers, and parameters defining the scope and frequency of data retrieval, tailored to the original request 404. For low latency mode, the access request 412 may include priority indicators. The data source 112 may authenticate the second data broker 114-2, validate the request parameters, allocate necessary resources, and begin transmitting the requested operational data 110 to the second data broker 114-2 at specified intervals or in real-time, as indicated in step 416. This establishes a data flow from the data source 112 to the second data broker 114-2.

In an example, as indicated in step 418, the operational data 110 accessed by the second data broker 114-2 may be communicated to the intermediate data broker 114-3 as per the specified publishing interval.

In an example, as indicated in step 420, since the intermediate data broker 114-3 is configured to keep its publishing and sampling interval low, the intermediate data broker 114-3 may transmit the operational data 110 to the first data broker 114-1 as soon as the operational data 110 is received at the intermediate data broker 114-3. In an example, this may involve the intermediate data broker 114-3 employing a push-based communication model, where the operational data 110 is forwarded to the next broker, that is the first data broker 114-1, in the chain without waiting for a pull request.

In an example, as indicated in step 422, the operational data 110 received by the first data broker 114-1 may be transmitted to the client 406 from where the request 404 for the operational data 110 originated.

Accordingly, by configuring the intermediate data broker 114-3 to keep the publishing and sampling intervals low and configuring only the second data broker 114-2, which is close to the data source 112, to observe the intervals, the present subject matter serves two purposes of reducing the latency while still maintaining compliance with the communication protocol to avoid risking security.

Figure 5:
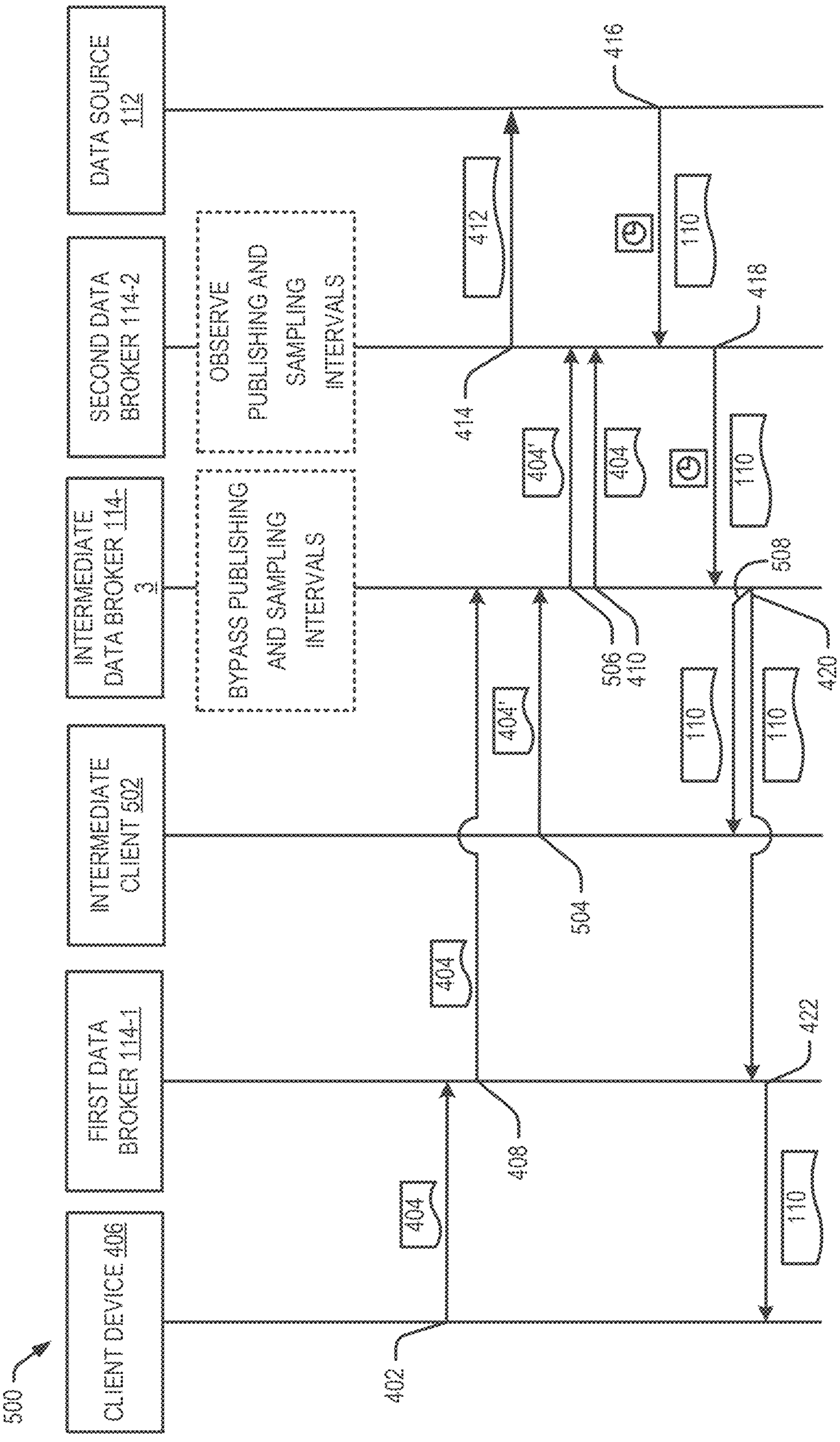
FIG. 5 illustrates a signal flow diagram depicting transmission of the data from the data source to an intermediate client device and the client device in the communication network, in accordance with an example implementation of the present subject matter.

FIG. 5 illustrates a signal flow diagram 500 depicting transmission of the operational data 110 from the data source 112 to a client connected to the first data broker 114-1 and an intermediate client positioned lower in the hierarchical chain of data brokers in the communication network 100 of the facility 102, in accordance with an example implementation of the present subject matter.

In some embodiments, multiple clients at different levels of the communication network 100 may subscribe to the same operational data 110. For example, a client connected to the intermediate data broker 114-3 at the second layer L2 may request similar operational data 110 as a client connected to the first data broker 114-1 at the top layer, that is the third layer L3, of the communication network 100. While these requests may target the same underlying operational data 110, they may differ in specific parameters. For example, the client at the second layer L2 may request different timing intervals, a subset of tags, or a different combination of tags related to the operational data 110 compared to the client at the top layer.

Even though the clients at different layers of the communication network 100 may have subscribed to different variants of the same operational data 110, this may not affect the functionality of the second data broker 114-2. The second data broker 114-2, which controls the timing and data collection from the data source 112, is positioned below all these clients in the network hierarchy. Because the second data broker 114-2 is below all the clients that have subscribed to the same or different variants of the operational data 110, behavior of the second data broker 114-2 may remain consistent, requiring no changes in its operation. This is because the second data broker 114-2 may operate independently of the requests from the clients, focusing solely on collecting and transmitting the operational data 110 from the data source 112. The second data broker 114-2 may be configured to collect all relevant operational data 110 at predefined intervals or based on specific triggers, regardless of the varying requirements of clients at higher levels. The second data broker 114-2 may then push this operational data 110 up the hierarchy. The customization of data for specific client needs, such as different timing parameters or subsets of tags, may be handled by the intermediate data broker 114-3 or the first data broker 114-1 higher up in the network, or by the client itself after receiving the operational data 110.

Thus, the operational data 110 may move from the bottom, starting at the second data broker 114-2, up to where the first client is connected, which in this case is the intermediate data broker 114-3 at the second layer L2 without requiring separate data streams or individual queries for each client.

In doing so, as indicated in step 504, a request 404' for the operational data 110 may be received at the intermediate data broker 114-3, for example, via the communication module 310 of the system 300, as per example implementation of the present subject matter. In embodiments where the client is directly connected to the intermediate data broker 114-3, such as depicted in FIG. 5, the request 404' may be received directly at the intermediate data broker 114-3. The request 404' may be received from an intermediate client, for example, an intermediate client 502. In an example, the request 404' received from the intermediate client 502 may be similar to the request 404 received from the client 406 connected to the first data broker 114-1, as indicated in step 402.

As indicated in step 506, the request 404' for the operational data 110 received from the intermediate client 502 may be communicated to the second data broker 114-2. This communication occurs along with the request 404 for the operational data 110 received from the client 406, as indicated in step 410.

As explained previously, upon receiving the request 404, 404', the second data broker 114-2 may send an access request 412 to the data source 112 for accessing the operational data 110, as indicated in step 414.

As previously explained, the data source 112 may authenticate the second data broker 114-2, validate the request parameters, allocate necessary resources, and initiate the transmission of the requested operational data 110 to the second data broker 114-2 at specified intervals or in real-time, as indicated in step 416. This process establishes a data flow from the data source 112 to the second data broker 114-2.

As indicated in step 418, the operational data 110 accessed by the second data broker 114-2 may be communicated to the intermediate data broker 114-3 according to the specified publishing interval.

As indicated in step 420, the intermediate data broker 114-3, may bypass the publishing and sampling interval, and pass the operational data 110 to the first data broker 114-1 as soon as receiving the operational data 110. This may involve the intermediate data broker 114-3 acting as a pass through a data broker, where the operational data 110 is forwarded to the next broker in the chain, namely the first data broker 114-1 without holding the operational data 110 at the intermediate data broker 114-3. As indicated in step 422, the operational data 110 received by the first data broker 114-1 may be transmitted to the client device 406 from where the request 404 for the operational data 110 originated.

Furthermore, as the intermediate data broker 114-3 is configured to act as a pass-through, the operational data 110 required by one client, such as the client 406 at the top of the communication architecture 100, may be simultaneously copied to the intermediate client 502. This may be achieved by configuring the intermediate data broker 114-3, for example, using the configuration client 116, to branch the operational data 110 from the intermediate data broker 114-3 to the intermediate client 502, as indicated in step 508. This process occurs while the operational data 110 continues its normal upward transmission through the communication network 100, passing through the intermediate data broker 114-3, thereby maintaining the pass-through mechanism for data transmission throughout the intermediate data brokers.

Thus, the intermediate data brokers in the communication network 100 streams the operational data 110 upward while branching the stream of the operational data 110 to multiple clients connected to the lower layers of the communication network 100. This means that the intermediate data brokers may replicate the operational data 110 to two or more locations simultaneously, accommodating any intermediate clients that may be connected. Consequently, this architecture is not limited to a single client-server connection but may efficiently handle multiple clients connecting at various layers of the communication network 100. This ensures data distribution and access across different layers of the network hierarchy with low latency and high efficiency regardless of the number or location of connected clients.

Figure 6:
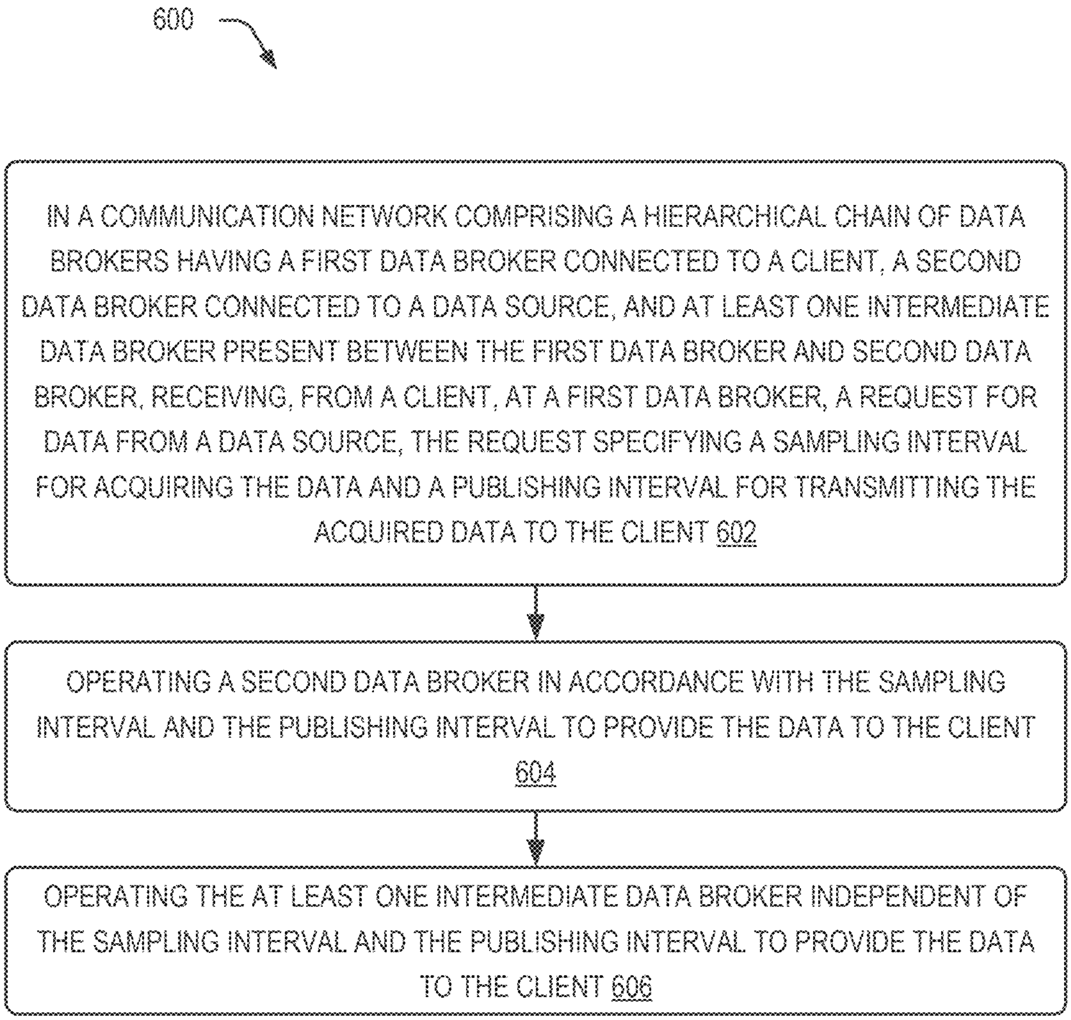
FIG. 6 illustrates a method for data provisioning in an industrial facility, according to an example implementation of the present subject matter.

FIG. 6 illustrates a flowchart of a method 600 for data provisioning in a facility, such as the facility 102, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer-readable medium. The non-transitory computer-readable medium may include, for example, digital memories, magnetic storage media, such as magnetic disks and magnetic tapes, hard drives, or optically readable digital data storage media. In an example, the method 600 may be performed by the system 108, 300.

Referring to FIG. 6, at block 602, the method 600 may include receiving, from a client, such as the client 406, connected to the first data broker 114-1, a request for data, such as the operational data 110, from the data source 112. In an example, the request may be received at the first data broker 114-1 either through the system 300 when the client 406 is connected to the system 300, or directly at the first data broker 114-1 in case the client 406 is connected at the first layer L1 where the first data broker 114-1 is implemented. In an example, the request may specify a sampling interval for acquiring the operational data 110 and a publishing interval for transmitting the acquired operational data 110 to the client 406. As explained previously, the sampling interval may correspond to the frequency at which the operational data 110 is to be collected from the data source 112, while the publishing interval may correspond to the frequency at which the collected operational data 110 is transmitted or made available to the client 406.

At block 604, method 600 may include operating the second data broker 114-2, which is closest to the data source 112, in accordance with the sampling interval and the publishing interval specified in the request to provide the operational data 110 to the client 406.

At block 606, the method 600 may include operating the intermediate data broker 114-3 present between the first data broker 114-1 and the second data broker 114-2 independent of the sampling interval and the publishing interval to provide the operational data 110 to the client 406.

As each intermediate data broker, such as the intermediate data broker 114-3, in the chain promptly pushes the operational data 110 to the next level without introducing additional waiting periods, the operational data 110 may reach the requesting client 406 or application more quickly, enabling near real-time monitoring and faster response times to changing conditions in the facility 102. Also, security is maintained by ensuring that the second data broker 114-2, which directly interfaces with the data source 112, adheres to the specified sampling and publishing intervals of the implemented communication protocol. This may prevent security vulnerabilities that may arise from excessive polling of the data source 112 while still allowing for rapid data transmission through the rest of the communication network 100.

Figure 7:
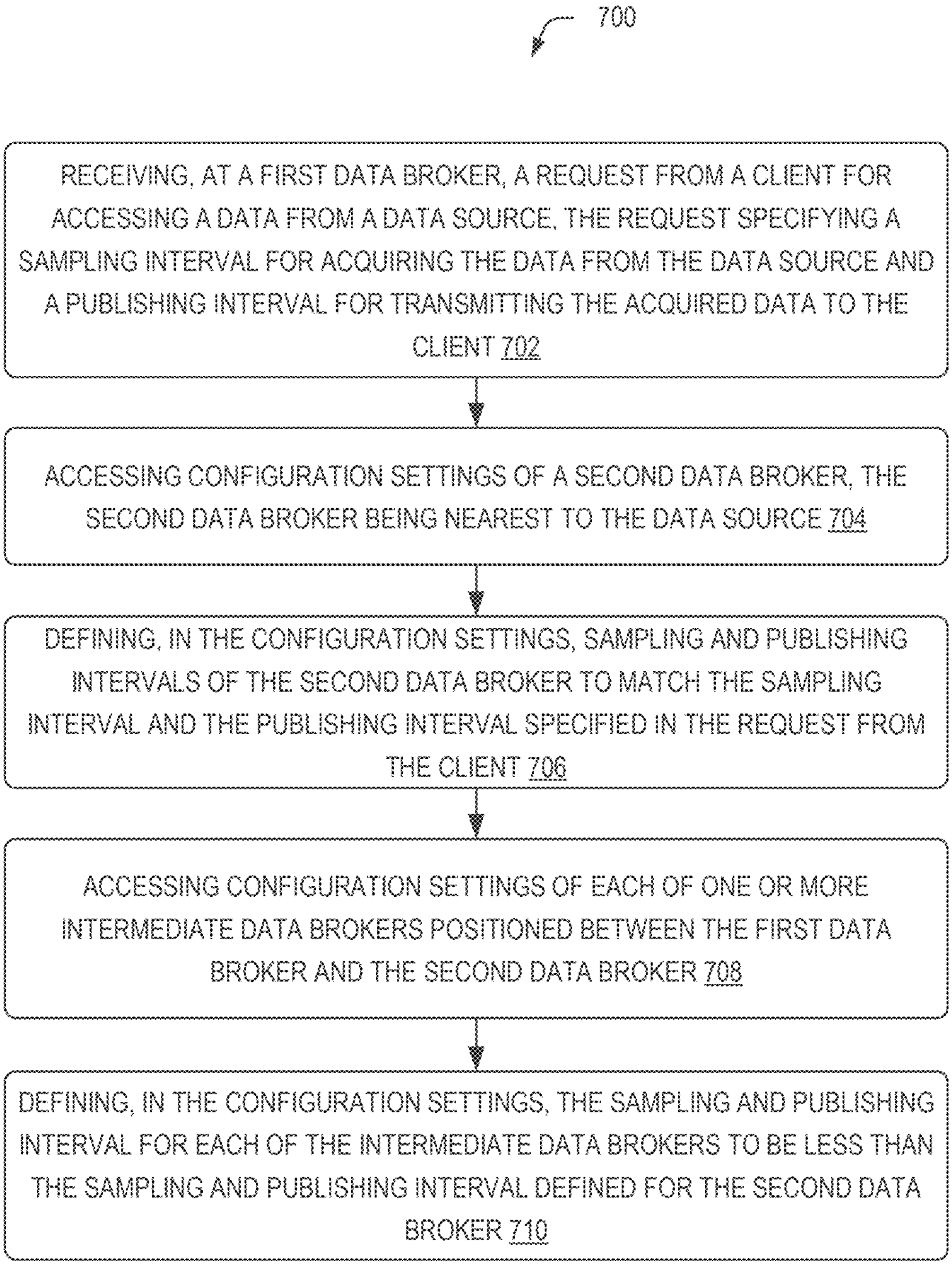
FIG. 7 illustrates a flow diagram of a process for configuring sampling and publishing intervals of intermediate data brokers, according to an example implementation of the present subject matter.

FIG. 7 depicts a flow diagram of a process 700 for optimizing the configuration of intermediate data brokers, such as the intermediate data broker 114-3, within the hierarchical chain of data brokers 114-1, 114-2, 114-3 to minimize the local sampling and publishing intervals of the intermediate data broker 114-3, enabling the rapid transmission of the operational data 110 up the hierarchy with reduced latency, in accordance with an example implementation of the present subject matter.

The order in which the above-mentioned process is described is not intended to be construed as a limitation, and some of the described process blocks may be combined in a different order to implement the process, or an alternative process.

Furthermore, the above-mentioned process may be implemented in a suitable hardware, computer-readable instructions, or combination thereof. The steps of such process may be performed by either a system under the instruction of machine executable instructions stored on a non-transitory computer readable medium or by dedicated hardware circuits, microcontrollers, or logic circuits. Herein, some examples are also intended to cover non-transitory computer readable medium, for example, digital data storage media, which are computer readable and encode computer-executable instructions, where the instructions perform some or all the steps of the above-mentioned methods. In an example, the process 700 may be implemented by the system 108, 300 of FIGS. 1-3.

As explained previously, a client, such as the client 406, subscribed to the operational data 110 may require the operational data 110 at low latency, for example, for real-time monitoring or rapid response to changing conditions in the facility 102. As explained previously, to transmit the operational data 110 to the client 406 at low latency while still being compliant with the implemented communication protocol for maintaining security of the communication network 100, the intermediate data broker 114-3 may be configured to operate at low latency and the second data broker 114-2, that is closest to the data source 112, may be configured to observe the specified sampling and publishing intervals. This configuration may involve setting the local sampling and publishing intervals of the intermediate data broker 114-3 to be shorter than the intervals specified in the client request and setting the local sampling and publishing intervals of the second data broker 114-2 to match the intervals specified in the client request, allowing for faster data propagation through the network layers.

Accordingly, at block 702, the process 700 may include receiving, at the first data broker 114-1, a request from a client, such as the client 406, for accessing a data, such as the operational data 110, from a data source, such as the data source 112. In an example, the request may specify the sampling interval for acquiring the operational data 110 from the data source and a publishing interval for transmitting the acquired operational data 110 to the client 406.

At block 704, the process 700 may include accessing, for example, by a configuration client, such as the configuration client 116, configuration settings of the second data broker 114-2. As explained previously, the configuration client 116 may be a component acting as a configuration utility that may be executed on any computing device, such as the configuration device 118. The configuration client 116 may function as a standalone thick client utility or be implemented as part of the system 300. The configuration client 116 may allow users, such as the facility manager, to modify settings and parameters of the data brokers 114-1, 114-2, 114-2. In an example, the configuration client 116 may communicate with the data brokers 114-1, 114-2, 114-2 through the established communication network 100.

At block 706, the process 700 may include defining, for example, in the configuration settings accessed by the configuration client 116, the sampling and publishing intervals of the second data broker 114-2 to match the sampling interval and publishing interval specified in the request received from the client 406.

At block 708, the process 700 may include accessing, for example, by the configuration client 116, configuration settings of each of the one or more intermediate data brokers, such as the intermediate data broker 114-3 that may be implemented between the first data broker 114-1 and the second data broker 114-2.

At block 710, the process 700 may include defining, for example, using the configuration client 116, in the configuration settings of the intermediate data broker 114-3, the sampling and publishing intervals for the intermediate data broker 114-3 to be less than the sampling and publishing intervals defined for the second data broker 114-2.

At block 710, the process 700 may include defining, for example, using the configuration client 116, in the configuration settings of the intermediate data broker 114-3, the sampling and publishing interval for each of the intermediate data brokers to be less than the sampling and publishing interval defined for the second data broker 114-2. As the sampling and publishing interval for the intermediate data broker 114-3 is set to be less than the sampling and publishing interval defined for the second data broker 114-2, whenever the operational data 110 is received by the intermediate data broker 114-3 from the second data broker 114-2, the operational data 100 may be forwarded to the next component in the hierarchy, that is the first data broker 114-1, in the data flow without waiting for the completion of the publishing and/or sampling interval of the intermediate data broker 114-3.

By configuring the data brokers 114-1, 114-2, 114-3 in this manner, the required sampling rate may be maintained at the second data broker 114-2 closest to the data source 112 while enabling rapid data transmission through the upper layers of the communication network 100. This may balance the need for low-latency data delivery with the security and resource management considerations of the communication network 100 of the facility 102.

Figure 8:
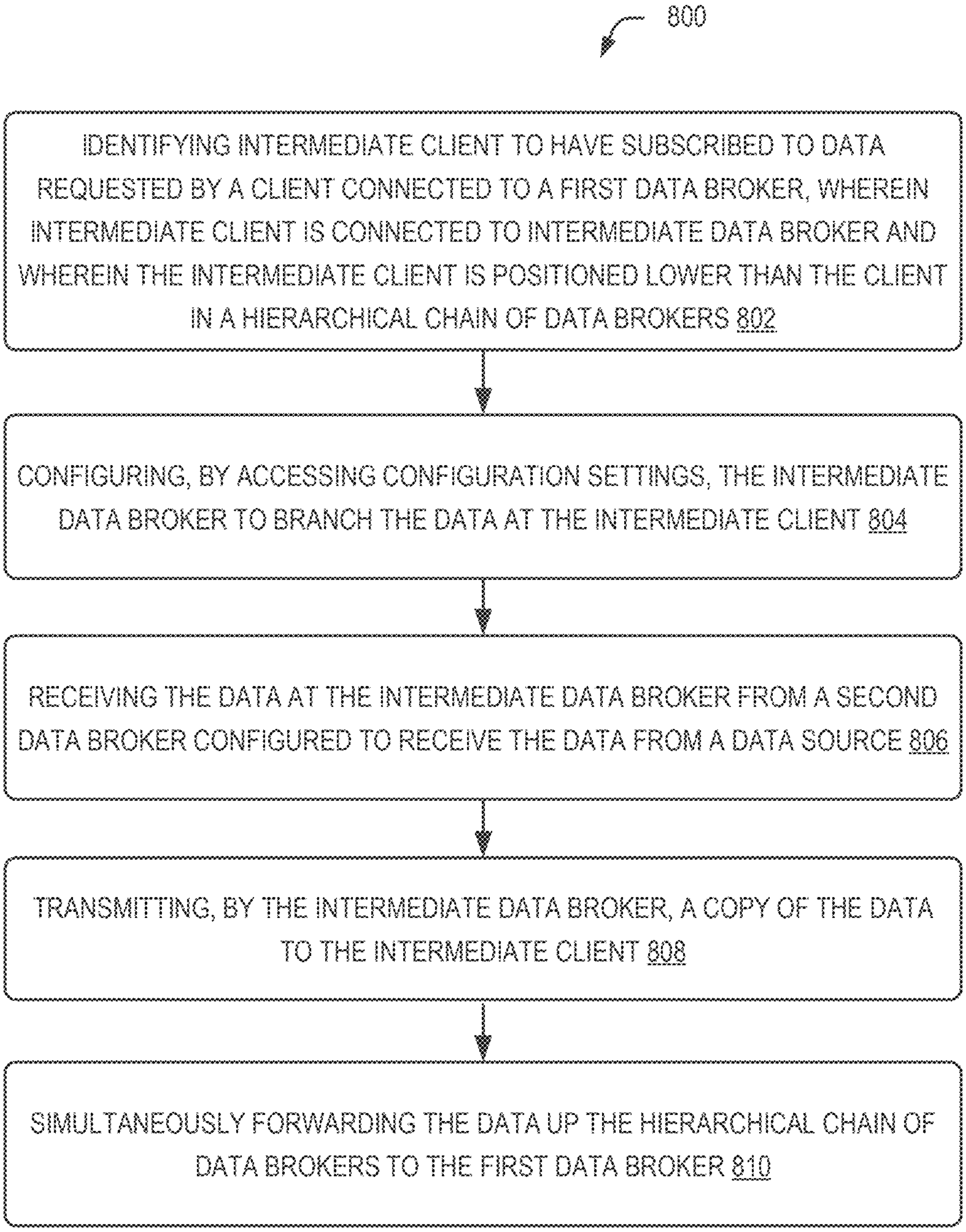
FIG. 8 illustrates a flow diagram of a process of transmitting data to an intermediate client, according to an example implementation of the present subject matter.

FIG. 8 illustrates a process 800 for transmitting data, such as the operational data 110, to intermediate clients connected to network layers situated between the layers where the first data broker 114-1 and the second data broker 114-2 are implemented, according to an example implementation of the present subject matter.

The order in which the above-mentioned process is described is not intended to be construed as a limitation, and some of the described process blocks may be combined in a different order to implement the process, or an alternative process.

Furthermore, the above-mentioned process 800 may be implemented in a suitable hardware, computer-readable instructions, or a combination thereof. The steps of such process may be performed by either a system under the instruction of machine executable instructions stored on a non-transitory computer readable medium or by dedicated hardware circuits, microcontrollers, or logic circuits. Herein, some examples are also intended to cover non-transitory computer readable medium, for example, digital data storage media, which are computer readable and encode computer-executable instructions, where the instructions perform some or all the steps of the above-mentioned methods. In an example, the process 800 may be implemented by the system 108, 300 of FIGS. 1-3.

As explained previously, various clients, such as the intermediate client 502, situated at lower levels within the communication network 100 may request access to the same operational data 110 that is subscribed to by a client, such as client 406, connected at the highest level of the communication network 100. Although the intermediate client 502 may specify different parameters for the subscription of the operational data 110, such as variations in timing intervals or subsets of data tags, the request may still be effectively similar in nature. In such embodiments, because the intermediate data broker 114-3 is configured to act as a pass-through, the operational data 110 that is needed for the client 406 may be duplicated and sent to the intermediate client 502, while simultaneously being forwarded up hierarchy to the client 406 at the top level of the communication network 100. This may eliminate the need for a separate data stream for the intermediate client 502, potentially reducing bandwidth usage and simplifying the overall data transmission process.

Accordingly, referring to FIG. 800, at block 802, the process 800 may include identifying an intermediate client, such as the intermediate client 502 to have subscribed to the operational data 110 requested by the client 406 connected to the first data broker 114-1. In an example, intermediate client 502 may be connected to the intermediate data broker 114-3. In an example, the intermediate client 502 may be positioned lower than the client 406 in the hierarchical chain of data brokers 114-1, 114-2, 114-3.

At block 804, the process 800 may include configuring, for example, by the configuration client 116, configuration settings of the intermediate data broker 114-3 so as to enable the intermediate data broker 114-3 to branch the operational data 110 received from the second data broker 114-2 at the intermediate client 502.

At block 804, the process 800 may include configuring, for example, by the configuration client 116, configuration settings of the intermediate data broker 114-3 so as to enable the intermediate data broker 114-3 to branch the operational data 110 received from the second data broker 114-2 at the intermediate client 502.

At block 806, the process 800 may include receiving the operational data 110 at the intermediate data broker 114-3 from the second data broker 114-2 that is configured to receive the operational data 110 from the data source 112 at the prespecified sampling interval and pass it on to the intermediate data broker 114-3 at the prespecified publishing interval.

At block 808, the process 800 may include transmitting, by the intermediate data broker 114-3, a copy of the operational data 110 to the intermediate client 502. In an example, this may be done by branching the operational data 110 received at the intermediate data broker 114-3 to the intermediate client 502. The branching operation may involve creating a duplicate stream of the operational data 110 specifically for the intermediate client 502, while maintaining the original data flow to higher levels of the communication network 100. For example, the intermediate data broker 114-3 may utilize a publish-subscribe pattern, where the intermediate data broker 114-3 acts as both a subscriber to the incoming operational data 110 from the second data broker 114-2 and a publisher to the intermediate client 502.

At block 810, the process 800 may include simultaneously forwarding the operational data 110 up the hierarchical chain of data brokers 114-1, 114-2, 114-3 to the first data broker 114-1. The first data broker 114-1 may then transmit the operational data 110 to the client 406.

Thus, branching of the operational data 110 enables the communication network 100 to work for not only one connection from a client to the data source 112, but if multiple clients decide to connect at different locations of the communication network 100, the communication network 100 continues to work for all of those clients, thereby enhancing the flexibility and scalability of the communication network 100. This may allow for efficient data distribution across various network layers without compromising the overall performance or requiring significant modifications to the existing the communication network.

Figure 9:
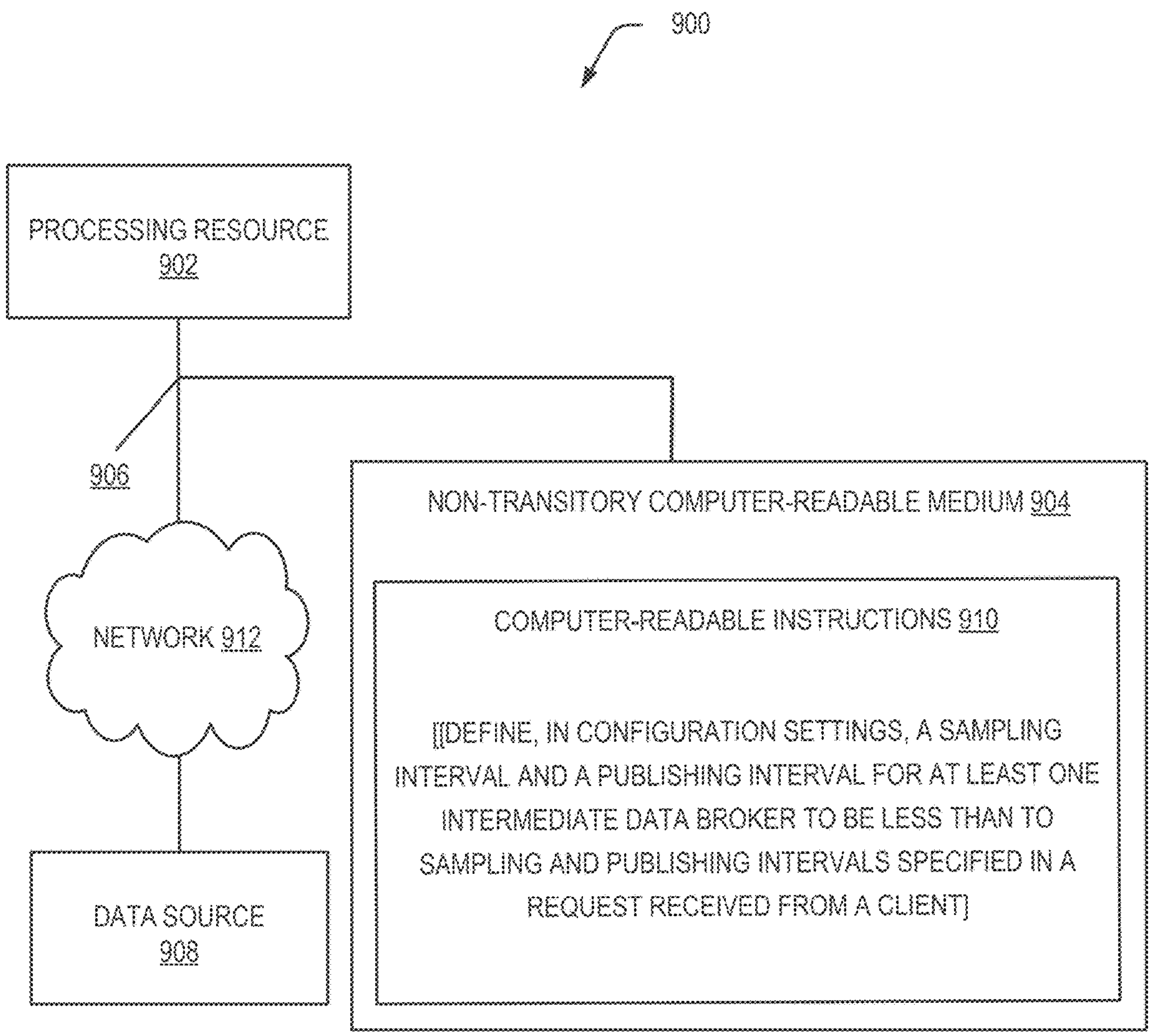
FIG. 9 illustrates a computing environment for data provisioning in an industrial facility, according to an example implementation of the present subject matter.

FIG. 9 illustrates a computing environment 900 for data provisioning in an industrial facility, such as the industrial facility 102, according to an example implementation of the present subject matter. In an example implementation, the computing environment 900 may comprise a computing device, such as the above-described system 108, 300. The computing environment 900 may include a processing resource 902 communicatively coupled to the non-transitory computer-readable medium 904 through a communication link 906.

In an example, the processing resource 902 may be a processor of the computing device, such as the processor 302 of the system 300, that fetches and executes computer-readable instructions from the non-transitory computer-readable medium 904.

The non-transitory computer-readable medium 904 may be, for example, an internal memory device or an external memory device. In an example implementation, the communication link 906 may be a direct communication link, such as any memory read/write interface. In another example implementation, the communication link 906 may be an indirect communication link, such as a network interface. In such a case, the processing resource 902 can access the non-transitory computer-readable medium 904 through a network 912. The network 912 may be a single network or a combination of multiple networks and may use a variety of different communication protocols.

The processing resource 902 and the non-transitory computer-readable medium 904 may also be communicatively coupled to data sources 908. In an example implementation, the non-transitory computer-readable medium 904 comprises executable instructions 910 for the data provisioning in the facility 102 in such a manner that when executed by the processing resource 902, cause the processing resource 902 to minimize the latency of the data transmission across the communication network 100.

In an example, the instructions 910 cause the processing resource 902 to implement, in the communication network 110 of the facility 102, a hierarchical chain of data brokers. In an example, the hierarchical chain of data brokers may include a first data broker, such as the first data broker 114-1 connected to a client, such as the client 406. Further, the chain of data brokers may include a second data broker, such as the second data broker 114-2 connected to a data source, such as the data source 112. Furthermore, the chain of data brokers may include one or more intermediate data brokers, such as the intermediate data broker 114-3 positioned between the first data broker 114-1 and the second data broker 114-2.

In an example, the instructions 910 may cause the processing resource 902 to receive, from the client 406, at the first data broker 114-1, a request for the operational data 110 from the data source 112. As explained previously, the request may specify a sampling interval for acquiring the operational data 110 and a publishing interval for transmitting the acquired operational data 110 to the client 406.

In another example, the instructions 910 may cause the processing resource 902 to access, via the configuration client 116, configuration settings of the second data broker 114-3 and define in the configuration settings of the second data broker 114-3, a sampling interval and a publishing interval that corresponds to the sampling and publishing intervals specified in the request received from the client 406. In yet another example, the instructions 910 may cause the processing resource 902 to access, via the configuration client 116, the configuration settings of the intermediate data broker 114-3 and define, in the configuration settings of the intermediate data broker 114-3, a sampling interval and a publishing interval that is less than the sampling and publishing intervals specified in the request received from the client 406. This ensures that when the intermediate data broker 114-3 receives the operational data 110 from the second data broker 114-3, the intermediate data broker 114-3 may transmit the received operational data 110 to the first data broker 114-1 process and forward the data without introducing additional latency.

In another example, the instructions 910 may cause the processing resource 902 to access, via the configuration client 116, configuration settings of the second data broker 114-2 and define in the configuration settings of the second data broker 114-2, a sampling interval and a publishing interval that corresponds to the sampling and publishing intervals specified in the request received from the client 406. In yet another example, the instructions 910 may cause the processing resource 902 to access, via the configuration client 116, the configuration settings of the intermediate data broker 114-3 and define, in the configuration settings of the intermediate data broker 114-3, a sampling interval and a publishing interval that is less than to the sampling and publishing intervals specified in the request received from the client 406. This ensures that when the intermediate data broker 114-3 receives the operational data 110 from the second data broker 114-2, the intermediate data broker 114-3 may forward the operational data 110 to the first data broker 114-1 without introducing additional latency.

In an example, the instructions 910 may cause the processing resource 902 to define in the configuration settings of the intermediate data broker 114-3, the sampling interval and the publishing interval to correspond to the sampling and publishing intervals specified in the request received from the client 406. This may be done in embodiments where the client 406 requesting the operational data 110 prefers to maintain consistent sampling and publishing intervals throughout the data flow chain. Such configuration flexibility may enables the processing resource 902 to accommodate specific client requirements, which may be necessary for precise data timing, regulatory compliance, maintaining data integrity, or when network capacity allows for consistent higher rates across all levels.

In an example, the instructions 910 may cause the processing resource 902 to identify an intermediate client, such as the intermediate client 502, subscribed to the operational data 110 subscribed by the client 406. In an example, the intermediate client 502 may be connected to the intermediate data broker 114-3, and positioned lower than the client 406 connected to the first data broker 114-1 in the hierarchical chain of the data brokers 114-1, 114-2, 114-3. In such embodiments, the processing resource 902 may be used to configure the intermediate data broker 114-3 to branch the operational data 110 to the intermediate client 502 while simultaneously transmitting the operational data 110 up the hierarchical chain of the data brokers to the first data broker 114-1. In an example, to branch the operational data 110, the intermediate data broker 114-3 may transmit the operational data 110 to the intermediate client 502 while simultaneously passing the data up the hierarchical chain of the data brokers to the first data broker 114-1.

In some embodiments, each component of the communication network 100, such as the data brokers 114-1, 114-2, and 114-3, may be connected to an actual device that produces data, such as the operational data 110. For example, these devices may be sensors or other data-generating equipment. These devices may be connected anywhere across the communication network 100, and thus the data may be introduced at any layer and passed through the communication network 100. Clients may also connect to the communication network 100 at various points along this chain.

In such embodiments, the instructions 910 may cause the processing resource 902 to determine, for each data broker in the hierarchical chain, whether the data broker is connected to a data source, such as the data source 112. For each data broker that is determined to be connected to the data source 112, the processing resource 902 may define, using the configuration client 116, in configuration settings of such data brokers, a sampling interval and a publishing interval to correspond to the sampling and publishing intervals specified in the request received from the client, such as the client 406. The processing resource 902 may further define, using the configuration client 116, in configuration settings of other intermediate data brokers, if any, that are above the data brokers connected to the data source, a pass-through mode that allows for transmitting received data without adhering to their own sampling and publishing intervals. For example, a hierarchical chain data brokers may include four layers of data brokers: DB1, DB2, DB3, and DB4. A client may be connected to DB1, but the data source the client needs to access may be connected to DB3 instead of the DB4. If the client requests data from the DB3 every 10 seconds, the system 300 may configure DB3 (connected to the data source) with a 10-second sampling and publishing interval. DB2 (intermediate data broker) may be configured in pass-through mode. DB1 (data broker to which the client is connected) may also be configured in pass-through mode. This configuration ensures that DB3 collects data at the rate requested by the client, while DB2 and DB1 pass the data through without introducing additional delays, minimizing latency in the multi-layered network structure.

In an example, the instructions 910 may cause the processing resource 902 to receive the operational data 110 from the first data broker 114-1 and perform, on the operational data 110, at least one of data analytics, data aggregation, data filtering, or anomaly detection.

In an example, the communication network 100 implemented in the facility may include, but is not limited to, an OPC UA based communication network.

Thus, the present subject matter provides for low latency data provisioning in industrial facilities with multi-layered networks. Although implementations of the system and method for low latency data provisioning have been described in language specific to structural features and/or methods, it is to be understood that the appended claims are not necessarily limited to the specific features or methods described. Rather, the specific features and methods are disclosed as example implementations of achieving low latency data provisioning in multi-layered industrial networks.

We claim:

1. A method for data provisioning in an industrial facility, comprising:

in a communication network comprising a hierarchical chain of data brokers having a first data broker connected to a client, a second data broker connected to a data source, and at least one intermediate data broker present between the first data broker and second data broker:

receiving, from the client, at the first data broker, a request for data from the data source, the request specifying a sampling interval for acquiring the data and a publishing interval for transmitting the acquired data to the client;

operating the second data broker in accordance with the sampling interval and the publishing interval to provide the data to the client;

configuring, via a configuration client, the at least one intermediate data broker such that a sampling interval and a publishing interval of the at least one intermediate data broker are less than or equal to the sampling interval and the publishing interval specified in the request; and operating the at least one intermediate data broker, based on the configuration, independent of the sampling interval and the publishing interval to provide the data to the client.

2. The method of claim 1, wherein operating the second data broker in accordance with the sampling interval and the publishing interval comprises:

sampling, at the second data broker, the data from the data source at the specified sampling interval; and publishing the sampled data from the second data broker to an upstream data broker in the hierarchical chain at the specified publishing interval, the upstream data broker being from amongst the at least one intermediate data broker.

3. The method of claim 1, wherein operating the at least one intermediate data broker independent of the sampling interval and the publishing interval comprises:

receiving, by the at least one intermediate data broker, the published data; and transmitting the received data to the first data broker, the first data broker being positioned upstream to the at least one intermediate data broker in the hierarchical chain of data brokers in the communication network.

4. The method of claim 1, further comprising:

determining an intermediate client to have subscribed to the data requested by the client connected to the first data broker, wherein the intermediate client is connected to the at least one intermediate data broker and wherein the intermediate client is positioned lower than the client connected to the first data broker in the hierarchical chain of data brokers; and branching the data to the at least one intermediate client in response to the determination.

5. The method of claim 4, wherein branching the data comprises:

transmitting, by the at least one intermediate data broker, the data to the intermediate client while simultaneously passing the data up the hierarchical chain of the data brokers to the first data broker.

6. The method of claim 1, further comprising:

accessing, via a configuration client, configuration settings of the second data broker; and defining in the configuration settings, a sampling interval and a publishing interval for the second data broker to correspond to the sampling and publishing intervals specified in the request received from the client.

7. The method of claim 1, further comprising defining in the configuration settings of the at least one intermediate data broker, the sampling interval, and the publishing interval to correspond to the sampling and publishing intervals specified in the request received from the client.

8. The method of claim 1, wherein the communication network is an Open Platform Communications Unified Architecture (OPC UA) based communication network.

9. A system for data provisioning in an industrial facility, comprising:

a processor to configure:

a first data broker to receive from a client, a request for data from a data source, the request specifying a sampling interval for acquiring the data and a publishing interval for transmitting the acquired data to the client;

a second data broker to:

sample the data from the data source at the specified sampling interval; and publish the sampled data to an upstream data broker at the specified publishing interval, the upstream data broker being from amongst at least one intermediate data broker between the first data broker and the second data broker in a hierarchical chain data brokers implemented in a communication network of the industrial facility; and a configuration client to access configuration settings of the at least one intermediate data broker and define a sampling interval and a publishing interval of the at least one intermediate data broker to be less than or equal to the sampling interval and the publishing interval specified in the request; and the at least one intermediate data broker to:

receive the published data; and transmit the received data to the first data broker, the first data broker being positioned upstream to the at least one intermediate data broker in the hierarchical chain of data brokers.

10. The system of claim 9, wherein the processor is to further:

configure an intermediate client to subscribed to the data requested by the client, wherein the intermediate client is connected to the at least one intermediate data broker and positioned below the first data broker in the hierarchical chain of data brokers; and operate the at least one intermediate data broker to branch the data to the intermediate client while simultaneously transmitting the data up the hierarchical chain to the first data broker.

11. The system of claim 9, wherein the processor is further configured to:

access, via a configuration client, configuration settings of the second data broker; and define in the configuration settings, a sampling interval and a publishing interval for the second data broker to correspond to the sampling and publishing intervals specified in the request received from the client.

12. The system of claim 9, wherein the system is to:

receive the data from the first data broker; and perform, on the data, at least one of data analytics, data aggregation, data filtering, or anomaly detection.

13. The system of claim 9, wherein the communication network is an Open Platform Communications Unified Architecture (OPC UA) based communication network.

14. A non-transitory computer-readable medium comprising instructions executable by a processing resource to:

implement, in a communication network of an industrial facility, a hierarchical chain of data brokers, the hierarchical chain of data brokers comprising a first data broker connected to a client, a second data broker connected to a data source, and at least one intermediate data broker positioned between the first data broker and second data broker;

receive, from the client, at the first data broker, a request for data from the data source, the request specifying a sampling interval for acquiring the data and a publishing interval for transmitting the acquired data to the client;

access, via a configuration client, configuration settings of the second data broker;

define in the configuration settings, a sampling interval and a publishing interval for the second data broker to correspond to the sampling and publishing intervals specified in the request received from the client;

access, via the configuration client, configuration settings of the at least one intermediate data broker; and define, in the configuration settings, a sampling interval and a publishing interval for the at least one intermediate data broker to be less than to the sampling and publishing intervals specified in the request received from the client.

15. The non-transitory computer-readable medium of claim 14, further comprising instructions executable by the processing resource to define in the configuration settings of the at least one intermediate data broker, the sampling interval and the publishing interval to correspond to the sampling and publishing intervals specified in the request received from the client.

16. The non-transitory computer-readable medium of claim 14, further comprising instructions executable by the processing resource to:

identify an intermediate client subscribed to the requested data, the intermediate client being connected to the at least one intermediate data broker, and wherein the intermediate client is positioned lower than the client connected to the first data broker in the hierarchical chain of the data brokers; and configure the at least one intermediate data broker to branch the data to the intermediate client while simultaneously transmitting the data up the hierarchical chain of the data brokers to the first data broker.

17. The non-transitory computer-readable medium of claim 14, wherein the communication network is an Open Platform Communications Unified Architecture (OPC UA) based communication network.

* * * * *